(12) United States Patent
Wang et al.

(10) Patent No.: US 12,507,253 B2
(45) Date of Patent: Dec. 23, 2025

(54) CONTROL INFORMATION TRANSMISSION METHOD AND DEVICE

(71) Applicant: Samsung Electronics Co., Ltd., Suwon-si (KR)

(72) Inventors: Yi Wang, Beijing (CN); Feifei Sun, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 18/017,281

(22) PCT Filed: Jul. 29, 2021

(86) PCT No.: PCT/KR2021/009865
§ 371 (c)(1),
(2) Date: Jan. 20, 2023

(87) PCT Pub. No.: WO2022/030877
PCT Pub. Date: Feb. 10, 2022

(65) Prior Publication Data
US 2023/0276457 A1     Aug. 31, 2023

(30) Foreign Application Priority Data

Aug. 3, 2020  (CN) .......................... 202010769444.7
Oct. 15, 2020  (CN) .......................... 202011104973.1
(Continued)

(51) Int. Cl.
*H04W 72/232*     (2023.01)
*H04W 72/0446*     (2023.01)
(Continued)

(52) U.S. Cl.
CPC ..... *H04W 72/232* (2023.01); *H04W 72/0446* (2013.01); *H04W 72/0453* (2013.01); *H04W 72/563* (2023.01)

(58) Field of Classification Search
CPC . H04L 5/0053; H04L 27/0006; H04L 5/0091; H04L 5/001; H04L 5/0005;
(Continued)

(56) References Cited

U.S. PATENT DOCUMENTS

2020/0021474 A1* 1/2020 Papasakellariou .... H04L 25/023
2022/0141805 A1* 5/2022 Tooher .................. H04L 5/0053
                                                          370/336
2025/0071775 A1* 2/2025 Tooher .................. H04W 72/23

OTHER PUBLICATIONS

Samsung, 'Corrections on Ultra Reliable Low Latency Communications Enhancements', R1-2005140, 3GPP TSG-RAN WG1 Meeting #101-e, e-Meeting, Jun. 13, 2020.
(Continued)

*Primary Examiner* — Jung Liu
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present application discloses a transmission method and equipment for control information. According to an aspect of the present application, a method performed by a user equipment (UE) in a communication system, comprising: determining a reference time duration; and determining, based on the reference time duration, the maximum number M of PDCCH monitoring and/or the maximum number N of non-overlapping control channel element CCE monitoring of the UE.

20 Claims, 11 Drawing Sheets

(30) Foreign Application Priority Data

Jan. 6, 2021 (CN) .......................... 202110013168.6
Mar. 22, 2021 (CN) .......................... 202110304382.7

(51) Int. Cl.
*H04W 72/0453* (2023.01)
*H04W 72/563* (2023.01)

(58) Field of Classification Search
CPC ........... H04L 27/26025; H04L 27/2666; H04L 27/2602; H04W 72/23; H04W 72/0446; H04W 74/0808; H04W 72/563; H04W 72/0453; H04W 72/232
See application file for complete search history.

(56) References Cited

OTHER PUBLICATIONS

Huawei et al., Power saving for reduced capability devices, R1-2003302, 3GPP TSG RAN WG1 Meeting #101-e, E-meeting, May 16, 2020.
Mediatek Inc., 'Discussion on reduced PDCCH monitoring for NR RedCap UEs', R1-2003688, 3GPP TSG RAN WG1 Meeting #101-e, e-Meeting, May 16, 2020.
Samsung, 'Corrections on NR-DC and on Cross-carrier Scheduling with Different Numerologies', R1-2005147, 3GPP TSG-RAN WG1 Meeting #101-e, e-Meeting, Jun. 13, 2020.

* cited by examiner

CONTROL INFORMATION TRANSMISSION METHOD AND DEVICE

TECHNICAL FIELD

The present application relates to the field of wireless communication technology, and more specifically, to methods and corresponding device for receiving and transmitting downlink control information and uplink control information.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

In a wireless communication system, the base station controls the downlink reception and uplink transmission of the UE terminal by sending downlink control information, and the UE terminal reports information used to assist the base station in downlink scheduling and uplink reception to the base station via the uplink control information. Downlink/uplink control information includes physical layer control information, control information of MAC layer, RRC layer, etc. The physical layer downlink control information is carried by the Physical Downlink Control Channel (PDCCH), and the physical layer uplink control information is carried by the Physical Uplink Control Channel (PUCCH) or the Physical Uplink Shared Channel (PUSCH).

Due to the limitation of the processing capability of the UE terminal, the number of PDCCHs that the UE terminal can detect (or monitor) per slot is limited. The number of PDCCHs that the UE terminal can detect is related to the flexibility of the base station to schedule PDCCHs and the complexity of the UE terminal. On the one hand, the more PDCCHs that the UE terminal can detect, the easier for the base station to select an appropriate position from these PDCCH positions to send the PDCCH to the UE, which can effectively reduce the PDCCH congestion probability of a plurality of UEs. On the other hand, the more PDCCHs that the UE terminal can detect, the higher processing capability and more power consumption that the UE terminal requirements.

Due to the limitation of the processing capability of the UE terminal, the bandwidth that the UE terminal can support is limited. The transmission of PDCCH and PUCCH will also be restricted by limited bandwidth.

In the case of the limited processing capability of the UE terminal, how to improve the transmission efficiency of downlink and uplink control information is a problem to be solved urgently.

Solution to Problem

According to an aspect of the present application, a method performed by a user equipment (UE) in a communication system is provided, the method comprises: determining a reference time duration; and determining, based on the reference time duration, the maximum number M of PDCCH monitoring and/or the maximum number N of non-overlapping control channel element CCE monitoring of the UE.

Alternatively, the reference time duration is determined based on a time length of a reference Sub-Carrier Space SCS.

Alternatively, the method further comprises: determining, by the UE, the PDCCH candidate to be monitored and/or the CCE to be monitored according to a predefined rule, if the sum of the number of PDCCH candidates for each physical downlink control channel PDCCH monitoring occasion in the reference time duration exceeds the maximum number M of the PDCCH monitoring, or the sum of the number of non-overlapping CCEs for each PDCCH in the reference time duration exceeds the maximum number N of the non-overlapping CCE; wherein the predefined rule comprises at least one of the following: determining, according to the number of slots or spans including PDCCH monitoring occasions and/or the number of non-overlapping CCEs in the reference time duration, the maximum monitoring number M1 of PDCCH candidates in each slot or span including PDCCH monitoring occasions, so that the number of PDCCH candidates in the reference time duration does not exceed the maximum number M of PDCCH monitoring; and/or determining the maximum monitoring number N1 of non-overlapping CCEs in each slot or span including the number of non-overlapping CCEs, so that the number of the non-overlapping CCEs in the reference time duration does not exceed the maximum number N of non-overlapping CCE monitoring; determining, according to the number of PDCCH search space SS in the reference time duration, the maximum monitoring number M1 of PDCCH candidates and/or the maximum monitoring number N1 of non-overlapping CCE for each SS, so that the number of PDCCH candidates in the reference time duration does not exceed the maximum number M of PDCCH monitoring, and/or the number of non-overlapping CCEs in the reference time duration does not exceed the maximum number N of non-overlapping CCE monitoring; determining, according to a time sequence of PDCCH monitoring occasions in the reference time duration, the maximum monitoring number M1 of PDCCH candidates and/or the maximum monitoring number N1 of non-overlapping CCEs for each PDCCH SS, so that the number of PDCCH candidates in the reference time duration does not exceed the maximum number M of PDCCH monitoring, and/or the number of non-overlapping CCEs in the reference time duration does not exceed the maximum number N of non-overlapping CCE monitoring; determining, according to a type of PDCCH SS in the reference time duration, the maximum monitoring number M1 and/or the maximum monitoring number N1 of non-overlapping CCEs for each SS, so that the number of PDCCH candidates in the reference time duration does not exceed the maximum number M of PDCCH monitoring, and/or so that the number of non-overlapping CCEs in the reference time duration does not exceed the maximum number N of non-overlapping CCE monitoring; determining, according to the type of PDCCH SS and the number of PDCCH SSs in the reference time duration, the maximum monitoring number M1 of PDCCH candidates and/or the maximum monitoring number N1 of non-overlapping CCEs for each SS, so that the number of PDCCH candidates in the reference time duration does not exceed the maximum number M of PDCCH monitoring, and/or the number of non-overlapping CCEs in the reference time duration does not exceed the maximum number N of non-overlapping CCE monitoring; determining, according to the type of PDCCH SS in the reference time duration and the time sequence of the PDCCH monitoring occasions in the reference time duration, the maximum monitoring number M1 of PDCCH candidates and/or the maximum monitoring number N1 of non-overlapping CCEs for each PDCCH SS, so that the number of PDCCH candidates in the reference time duration does not exceed the maximum number M of PDCCH monitoring, and/or the number of non-overlapping CCEs in the reference time duration does not exceed the maximum number N of non-overlapping CCE monitoring; and determining, according to the type of PDCCH SS in the reference time duration and the number of slots or spans including the PDCCH monitoring occasions of each SS in the reference time duration, the maximum monitoring number M1 of the PDCCH candidates and/or the maximum monitoring number N1 of non-overlapping CCEs for each SS, so that the number of PDCCH candidates in the reference time duration does not exceed the maximum number M of PDCCH monitoring, and/or the number of non-overlapping CCEs in the reference time duration does not exceed the maximum number N of non-overlapping CCE monitoring; and/or determining the number of PDCCH monitoring and the number of non-overlapping CCE monitoring to be detected within a predefined time period in adjacent time units, so that the number cannot exceed a predefined value; and/or determining that, in two adjacent time units, the time interval of the PDCCH MOs in different time units cannot be less than a predefined value.

Alternatively, the starting point of the reference time duration is predefined or configured by the base station.

Alternatively, the PDCCH SS is configured such that one of the specific CSS appears only once in one sub-time window in one reference time duration; or, the PDCCH SS is configured such that at least two of the specific CSS appear in one sub-time window or in at least two sub-time windows in one reference time duration, wherein the specific CSS is: Type-1 CSS not configured based on dedicated RRC signaling (for example, at least one of Type-1 CSS, Type-0 CSS, Type-GA CSS, and Type-2 CSS configured through PDCCH common configuration (PDCCH-Configcommon)).

Alternatively, the method further comprises: determining, according to the type of PDCCH SS, the priority of the SS, and prioritizing the monitoring number of PDCCH and/or the monitoring number of non-overlapping CCEs of the SS with high priority; wherein the priority of the SS is determined according to at least one of the following rules: a common search space CSS has a higher priority than a user-specific search space USS; Type 0 PDCCH CSS has the highest priority; Type 0/Type GA PDCCH CSS has the highest priority; Type 0, Type GA, Type 1 PDCCH CSS, and Type 2 PDCCH CSS have a higher priority than Type 3 CSS; the CSS with a low CSS index has a higher priority than the CSS with a high CSS index in one cell; each CSS has the same priority in one cell; each Type 3 CSS has the same priority in one cell; the SS of a primary cell has higher priority than the SS of a secondary cell; the USS of the primary cell has a higher priority than the USS of the secondary cell; the USS with a low USS index has a higher priority than the USS with a high USS index in one cell; each USS has the same priority in one cell; and a search space configured with a specific downlink control information DCI format has a higher priority than search spaces configured with other DCI formats.

Preferably, the interval between any two SS positions that do not partially or completely overlap is not less than a predefined threshold Th1.

Alternatively, the method further comprises: configuring scaling factors to control the number of PDCCH candidates for each SS, wherein different scaling factors are configured for different priorities to control the number of PDCCH candidates for SSs with different priorities, or wherein configuring the same scaling factor for SSs with the same priority to reduce the number of PDCCH candidates in an equal proportion.

Alternatively, the UE determines the number of PDCCH candidates and/or the number of non-overlapping CCEs to be monitored based on receiving an indication from the base station, and wherein the indication is received through physical layer signaling or MAC layer signaling.

Alternatively, determining, by the UE, the number of PDCCH candidates and/or the number of non-overlapping CCEs to be monitored comprises: determining, by the UE, the number of PDCCH candidates and/or the number of non-overlapping CCEs to be monitored based on a table indicated by the base station, if the base station configures one or more tables indicating the maximum number of PDCCHs and/or the maximum number of non-overlapping CCEs to be monitored by one or more UEs; determining, by the UE, the number of PDCCH candidates and/or the number of non-overlapping CCEs to be monitored based on a scaling factor and a default table indicated by the base station, if the base station configures one or more scaling factors; determining, by the UE, the number of PDCCH candidates and/or the number of non-overlapping CCEs to be monitored based on the scaling factors and tables indicated by the base station, if the base station configures one or more scaling factors and one or more tables; and/or determining, by the UE, the number of PDCCH candidates in each search space to be monitored based on the scaling factor indicated by the base station and the number of PDCCH candidates in each search space configured by the base station, if the base station configures the number of PDCCH candidates in each search space and configures one or more scaling factors.

Alternatively, determining, by the UE, the number of PDCCH candidates and/or the number of non-overlapping CCEs to be monitored further comprises: determining, by the UE, the number of PDCCH candidates and/or the number of non-overlapping CCEs to be monitored based on the scaling factor configured by the base station for each SS set and/or the maximum number of PDCCH and/or the maximum number of non-overlapping CCEs to be monitored by the UE configured by the base station for each SS set, if the base station configures a plurality of SS sets, and each SS set comprises one or more SSs.

Alternatively, determining, by the UE, the number of PDCCH candidates and/or the number of non-overlapping CCEs to be monitored further comprises: determining, by the UE, whether to monitor the PDCCH of the SS set according to whether each SS set belongs to the same SS bundle, if the base station configures a plurality of SS sets. The UE determines the number of PDCCH candidates and/or the number of non-overlapping CCEs to be monitored according to whether each SS set belongs to the same SS bundle. Wherein one SS bundle comprises a set of SSs used for multiple repetition transmissions of one PDCCH. Alternatively, the method further comprises: receiving, by the UE, from the base station a parameter for determining a starting point of the PDCCH candidate to be monitored.

Alternatively, the method further comprises: determining the number of PDCCH candidates for each aggregation level AL according to a predefined rule, if the number of PDCCH candidates determined by an SS is less than the number of PDCCH candidates configured by the base station, wherein the predefined rule is: prioritizing the number of PDCCH candidates with a larger AL, and/or reducing the number of PDCCH candidates in equal proportion among each AL.

Alternatively, the method further comprises: receiving, by the UE, PDCCH on different sub-bands based on a control resource set CORESET/search space SS configured by the base station on a plurality of sub-bands.

Alternatively, the method further comprises: determining, by the UE, the sub-band of CORESET/SS where the PDCCH currently to be monitored is located according to the indication of the base station and predefined rules, wherein the determining comprises at least one of the following: determining, by the UE, the sub-band of CORESET/SS where the PDCCH currently to be monitored is located based on the relationship between the CORESET/SS sub-band set and the time resource configured by the base station; determining, by the UE, the sub-band of CORESET/SS where the PDCCH currently to be monitored is located based on the sub-band of CORESET/SS indicated by the base station through signaling; determining, by the UE, the sub-band of CORESET/SS where the PDCCH currently to be monitored is located according to the sub-band where the PDSCH is located; and determining, by the UE, the sub-band of CORESET/SS where the PDCCH currently to be monitored is located according to the sub-band where the PDSCH is located and the sub-band set of CORESET/SS.

Alternatively, the method further comprises: determining, by the UE, frequency domain resource positions of each SS region for one SS bundle according to the frequency domain resources and BWP/sub-band information, in the case that the base station configures CORESET/SS frequency domain resources and BWP/sub-band information; and/or determining, by the UE, the frequency domain resource positions of each SS region for one SS bundle according to the frequency domain resources and frequency domain offset information, in the case where the base station configures CORESET/SS frequency domain resources and frequency domain offset information, wherein one SS bundle comprises an SS set used for multiple repetition transmissions of one PDCCH, and one SS bundle includes multiple PDCCH SS regions.

Alternatively, various SS regions that constitute one SS bundle are located in the same BWP, and each SS region can be located in the same or different sub-bands in the same BWP; or various SS regions that constitute one SS bundle are located in different BWPs.

Alternatively, the method further comprises: determining, by the UE, which one or more CORESETs/SSs to receive according to a predefined rule, when the base station configures a plurality of CORESETs/SSs that overlap in the time dimension and the sub-bands/BWPs in which the CORESETs/SSs are located are different, wherein the predefined rule is to preferentially receive the SS with a high priority, wherein the priority is at least one of the following: the common search space CSS has a higher priority than the user-specific search space USS; if there are a plurality of CSSs, the CSS with a smaller index value has a higher priority; if there are a plurality of USSs, the USS with a smaller index value has a higher priority; the specific type of CSS has a higher priority than the type 3 PDCCH CSS, and the specific type of the CSS comprises at least one of Type 0 PDCCH CSS, Type 0A PDCCH CSS, Type 1 PDCCH CSS, and Type 2 PDCCH CSS; the search space configured with a specific DCI format has a higher priority than the search spaces configured with other DCI formats.

Alternatively, the method further comprises: determining, by the UE, which one or more CORESETs/SSs to receive according to a predefined rule and receiving other CORESET/SS on the sub-band i/BWPi of the one or more CORESETs/SSs, when the base station configures a plurality of CORESETs/SSs that overlap in the time dimension and the sub-bands/BWPs where the CORESETs/SSs are located are different.

Alternatively, the method further comprises: keeping, by the UE, receiving signals on one sub-band until X symbol before a starting point of a signal of the next sub-band start to switch to the next sub-band, in the case that the base station configures CORESET/SS frequency domain resources and BWP/sub-band information.

Alternatively, the method further comprises: determining, by the UE, the BWP/sub-band where the PDSCH scheduled by the PDCCH is located by using the BWP/sub-band where the PDCCH repeated for the $Ri^{th}$ time is located as frequency domain point, when the number of repetitions of the physical downlink control channel PDCCH of the physical downlink shared channel PDSCH scheduled by the base station is greater than 1, the UE uses, determine wherein the PDCCH repeated for the $Ri^{th}$ time is the first sent PDCCH, or the last sent PDCCH, or the PDCCH with the maximum number of repetitions.

Alternatively, the method further comprises: determining, by the UE, the BWP/sub-band where the PDSCH scheduled by the PDCCH is located, by using the BWP/sub-band where the PDCCH resource of the $Hi^{th}$ frequency hopping of the PDCCH is located as the reference frequency domain point, when the frequency hopping of physical downlink control channel PDCCH of the physical downlink shared channel PDSCH scheduled by the base station occurs, wherein the $Hi^{th}$ frequency hopping is the first sent frequency hopping area, or the last sent frequency hopping area, or the frequency hopping area with a maximum number of frequency hopping times.

Alternatively, the start symbol of the PDSCH cannot be earlier than the start symbol which is transmitted for the last time of the PDCCH scheduling the PDSCH; or, the start symbol of the PDSCH cannot be earlier than the start symbol of the slot in which the PDCCH scheduling the PDSCH for the last repeated transmission; or wherein the start symbol of the PDSCH cannot be earlier than the start symbol of the last frequency hopping region of the PDCCH scheduling the PDSCH; or wherein the start symbol of the PDSCH cannot be earlier than the X symbols before the start symbol of the last frequency hopping region of the PDCCH scheduling the PDSCH; or wherein the last repetition of the transmission or the last frequency hopping region is determined according to the maximum number of repetition times or the maximum number of frequency hopping times.

Alternatively, if a plurality of PDCCH MOs or SS regions for one SS bundle belong to different SS sets, and each SS set is respectively associated with a CORESET, then time window A is determined, and it is determined that which PDCCH transmissions that belong to different SS sets in the time window A belong to multiple repeated transmissions of the same PDCCH.

Alternatively, the parameters of time window A are configured by the base station. The base station can configure at least one of the starting point, time length, and period of the time window A.

Alternatively, the parameter of the time window A is determined by the parameters of a plurality of SS sets in one SS bundle. The parameter of the time window A is determined by at least one of the period and/or the time offset of the plurality of SS sets.

Alternatively, the time length of the time window A is determined: by the least common multiple of the periods of the plurality of SS sets; or by the greatest common divisor of the periods of the plurality of SS sets; or by the period of one of the plurality of SS sets, wherein the one SS set is the SS set with the largest period or the smallest period, or the one SS set is the SS set with the smallest or largest SS set index, or the one SS set is the SS set with the smallest or largest corresponding CORESET index.

Alternatively, the starting point of the time window A is determined according to the starting point of the k*N+1th period of one or more SS sets, wherein N is the number of periods of one SS set within the time length of one time window A, and k=0, 1, . . . .

Alternatively, within one time window A, if the numbers of PDCCH MOs of the plurality of SS sets in one SS bundle are not equal, the PDCCH MOs that can be used for repeated PDCCH transmission are determined according to the minimum number of PDCCH MOs.

Alternatively, the plurality of SS sets in one SS bundle number the PDCCH MO in each PDCCH MO slot, and the PDCCH MO with the same PDCCH MO number in one slot is used as a PDCCH repetition transmission position.

According to another aspect of the present application, a user equipment is provided, and the user equipment comprises a transceiver and a controller, and is configured to perform the above method.

Advantageous Effects of Invention

A method and apparatus for control information Transmission is provided.

BRIEF DESCRIPTION OF DRAWINGS

Through the following description in conjunction with the accompanying drawings, the above and additional aspects and advantages of the present application will become more obvious and easier to understand, among which.

MODE FOR THE INVENTION

Figure 1:
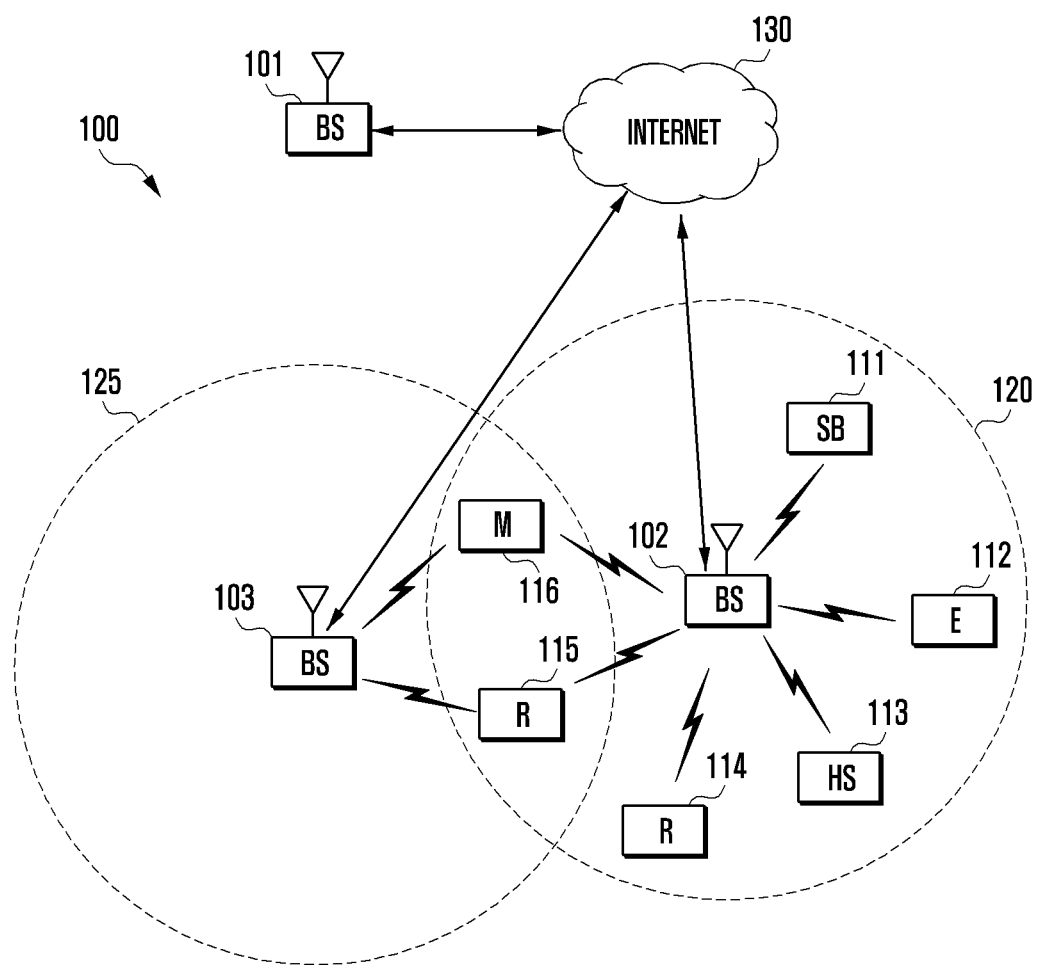
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
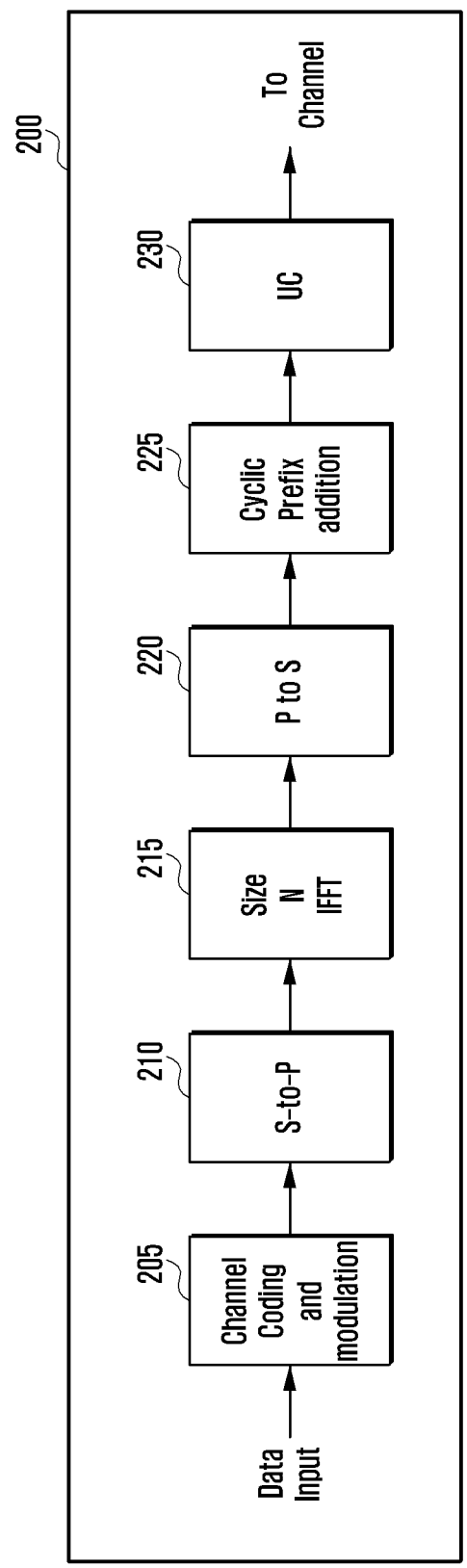
FIGS. 2a and 2b illustrate example wireless transmission and reception paths according to the present disclosure.
Figure 2B:
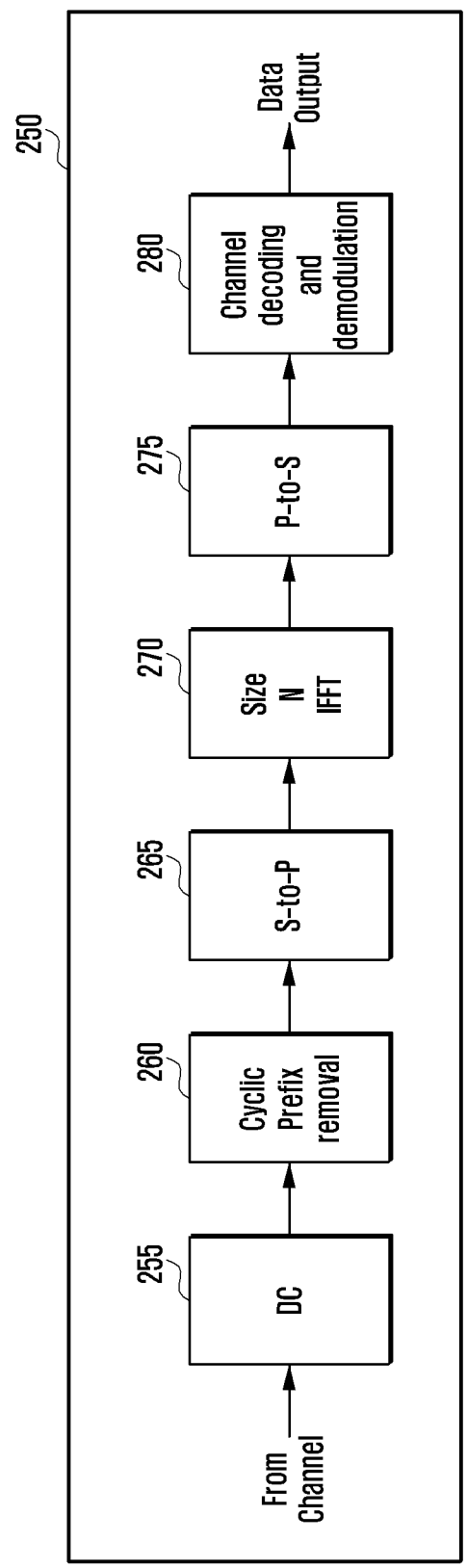

FIGS. 2*a* and 2*b* illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2*a* and 2*b* can be implemented using only hardware, or using a combination of hardware and software/firmware. As a specific example, at least some of the components in FIGS. 2*a* and 2*b* may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2a and 2b illustrate examples of wireless transmission and reception paths, various changes may be made to FIGS. 2a and 2b. For example, various components in FIGS. 2a and 2b can be combined, further subdivided or omitted, and additional components can be added according to specific requirements. Furthermore, FIGS. 2a and 2b are intended to illustrate examples of types of transmission and reception paths that can be used in a wireless network. Any other suitable architecture can be used to support wireless communication in a wireless network.

Figure 3A:
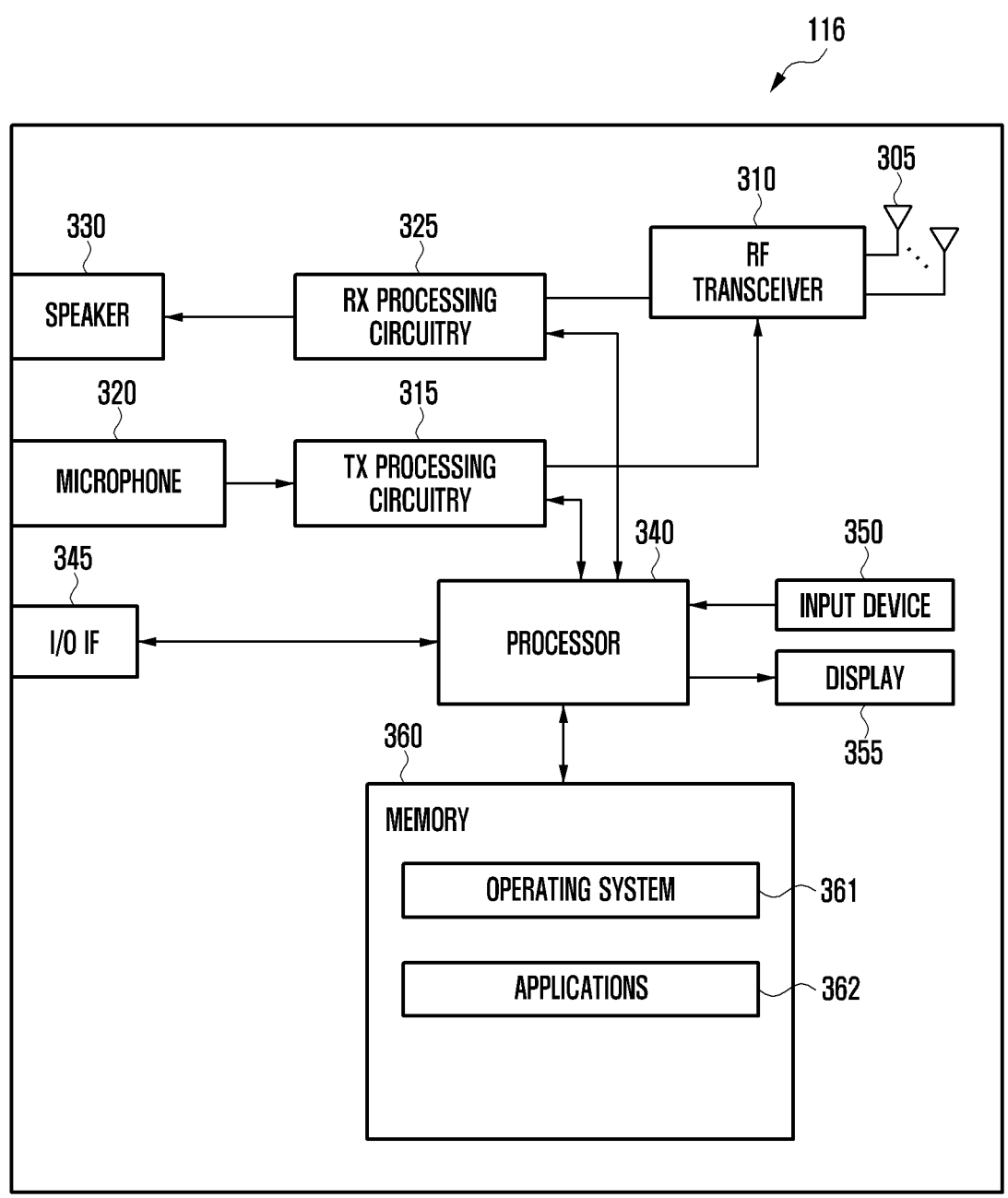
FIG. 3a illustrates an example user equipment according to the present disclosure.

FIG. 3a illustrates an example UE 116 according to the present disclosure. The embodiment of UE 116 shown in FIG. 3a is for illustration only, and UEs 111-115 of FIG. 1 can have the same or similar configuration. However, a UE has various configurations, and FIG. 3a does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3a illustrates an example of UE 116, various changes can be made to FIG. 3a. For example, various components in FIG. 3a can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3a illustrates that the UE 116 is configured as a mobile phone or a smart phone, UEs can be configured to operate as other types of mobile or fixed devices.

Figure 3B:
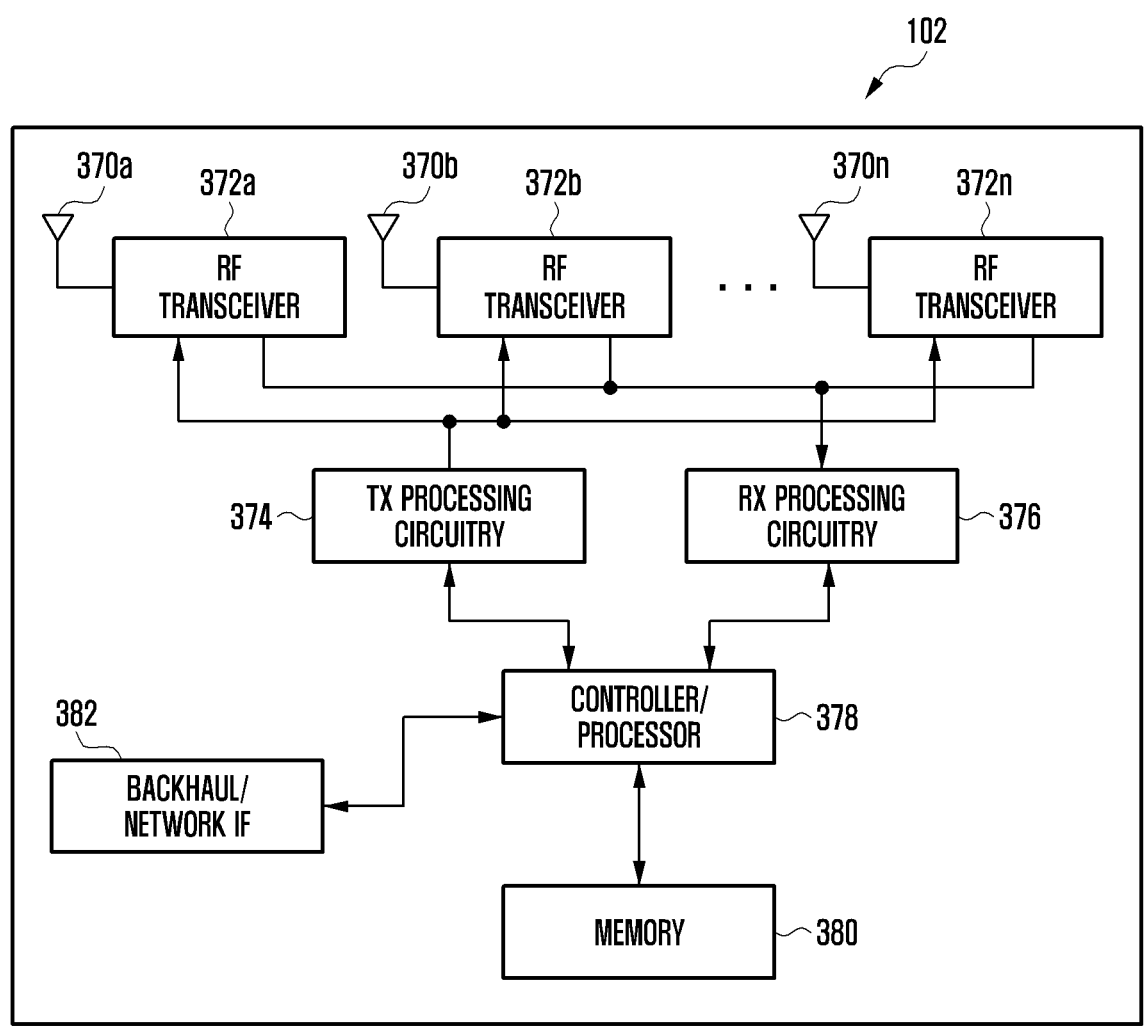
FIG. 3b illustrates an example base station according to the present disclosure.

FIG. 3b illustrates an example gNB 102 according to the present disclosure. The embodiment of gNB 102 shown in FIG. 3b is for illustration only, and other gNBs of FIG. 1 can have the same or similar configuration. However, a gNB has various configurations, and FIG. 3b does not limit the scope of the present disclosure to any specific implementation of a gNB. It should be noted that gNB 101 and gNB 103 can include the same or similar structures as gNB 102.

As shown in FIG. 3b, gNB 102 includes a plurality of antennas 370a-370n, a plurality of RF transceivers 372a-372n, a transmission (TX) processing circuit 374, and a reception (RX) processing circuit 376. In certain embodiments, one or more of a plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n downconvert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and upconvert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. A plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3b illustrates an example of gNB 102, various changes may be made to FIG. 3b. For example, gNB 102 can include any number of each component shown in FIG. 3a. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

The exemplary embodiments of the present disclosure are further described below in conjunction with the accompanying drawings.

The description and drawings are provided as examples only to help readers understand the present disclosure. They are not intended and should not be interpreted as limiting the scope of the present disclosure in any way. Although certain embodiments and examples have been provided, based on the content disclosed herein, it is obvious to those skilled in the art that modifications to the illustrated embodiments and examples can be made without departing from the scope of the present disclosure.

In a wireless communication system, the base station controls the downlink reception and uplink transmission of the UE terminal by sending downlink control information, and the UE terminal reports information used to assist the base station in downlink scheduling and uplink reception to the base station via the uplink control information. Downlink/uplink control information includes physical layer control information, control information of MAC layer, RRC layer, etc. The physical layer downlink control information is carried by the Physical Downlink Control Channel (PDCCH), and the physical layer uplink control information is carried by the Physical Uplink Control Channel (PUCCH) or the Physical Uplink Shared Channel (PUSCH).

Due to the limitation of the processing capability of the UE terminal, the number of PDCCHs that the UE terminal can detect (or monitor) per slot is limited. The number of PDCCHs that the UE terminal can detect is related to the flexibility of the base station to schedule PDCCHs and the complexity of the UE terminal. On the one hand, the more PDCCHs that the UE terminal can detect, the easier for the base station to select an appropriate position from these PDCCH positions to send the PDCCH to the UE, which can effectively reduce the PDCCH congestion probability of a plurality of UEs. On the other hand, the more PDCCHs that the UE terminal can detect, the higher processing capability and more power consumption that the UE terminal requirements.

Due to the limitation of the processing capability of the UE terminal, the bandwidth that the UE terminal can support is limited. The transmission of PDCCH and PUCCH will also be restricted by limited bandwidth.

In the case of the limited processing capability of the UE terminal, how to improve the transmission efficiency of downlink and uplink control information is a problem to be solved urgently.

The base station controls the UE's signal reception and transmission by sending the physical downlink control channel PDCCH. The base station sends the PDCCH on some or all of the resources in a specific downlink time-frequency resource set. In order to enable the UE to receive the PDCCH correctly, the base station needs to configure the downlink time-frequency resource set for the UE.

For example, in a 5G system, the base station configures a Control Resource Set (CORESET) for user to determine frequency domain resource information, such as a Physical Resource Block PRB (for example, the frequency domain resources of CORESET indicate the located PRB), time domain resource length (for example, the duration indicates the number of OFDM symbols continuously occupied), mapping mode (for example, the CCE-REG-MappingType indicates whether the mapping mode is based on interleaving), etc. The base station also configures the Search Space (SS) for user to determine time resource information, for example, period and time offset (such as monitoringSlotPeriodicityAndOffset), the number of consecutively occupied slots in one period (such as duration), symbol starting point (such as Monitoring Symbols Within Slot) of each SS region/PDCCH Monitoring Occasion (PDCCH MO) in one slot, search space type, Downlink Control Information (DCI) format, Aggregation Level (AL), the number of PDCCH candidates (such as nrofCandidates), etc. Based on these information, the UE can determine the time-frequency resources of each SS region/PDCCH MO, and determine AL, the number of candidates and DCI format, etc of the PDCCH candidates in these SS regions/PDCCH MO.

In the present application, the search space SS and search space set SSS have the same meaning. Although search space or SS is used in the specific description, it can be replaced with search space set or SSS. In addition, in the present application, SS region and monitoring occasion have the same meaning, and the two can be used interchangeably.

Generally, one PDCCH may include L1 Control Channel Elements (CCEs), one CCE includes L2 Resource Element Groups (REG), and one REG includes M PRBs. Depending on the value of L1, the AL of the PDCCH is different, and the value of AL is the same as the value of L1. For example, when AL=1, L1=1, that is, the PDCCH with AL=1 includes 1 CCE. In the existing 5G system, one CCE includes 6 REGs, that is, L2=6. One REG includes M=1 PRB, and the time unit of the PRB is 1 symbol.

Due to the limited processing capability of the UE terminal, the number of PDCCH candidates and the number of non-overlapping CCEs that the UE terminal can detect in a unit time are limited. According to an implementation, the maximum number of PDCCH candidates and the maximum number of non-overlapping CCEs that a UE terminal can detect in one slot are defined standardly, and the UE terminal must have corresponding processing capability to support this number. Table 1 and Table 2 give an example. According to another implementation, different UE terminals have different processing capabilities, and the UE terminal reports the maximum number of PDCCH candidates and the maximum number of non-overlapping CCEs that can be supported in one slot to the base station. According to another implementation, the maximum number of PDCCH candidates and the maximum number of non-overlapping CCEs that the UE terminal can detect in one span within one slot are defined standardly. Table 3 and Table 4 give an example. A span is the number of consecutive symbols (time dimension) on which the UE is configured to monitor the PDCCH in one slot. A PDCCH monitoring occasion is limited within one span, that is, it cannot exceed one span. The span is related to the parameters (X, Y), where X is the time distance of the first symbol of two consecutive spans, and Y is the time length of one span, for example (X, Y)=(2, 2), (4, 3), and (7, 3). The UE can report the combination of supportable (X, Y) to the base station.

TABLE 1

Maximum number of monitored PDCCH candidates per slot for a single serving cell (determined respectively according to SCS parameters $\mu \in \{0, 1, 2, 3\}$)

| $\mu$ | Maximum number of monitored PDCCH candidates per slot for a single serving cell $M_{PDCCH}^{max, slot, \mu}$ |
|---|---|
| 0 | 44 |
| 1 | 36 |
| 2 | 22 |
| 3 | 20 |

TABLE 2

Maximum number of monitored non-overlapping CCEs per slot for a single serving cell (according to SCS parameters $\mu \in \{0, 1, 2, 3\}$)

| $\mu$ | Maximum number of monitored non-overlapping CCEs per slot for a single serving cell $M_{PDCCH}^{max, slot, \mu}$ |
|---|---|
| 0 | 56 |
| 1 | 56 |
| 2 | 48 |
| 3 | 32 |

TABLE 3

Maximum number of monitored PDCCH candidates in one span for combination (X, Y) for a single serving cell (determined respectively according to SCS parameters $\mu \in \{0, 1\}$)

| | Maximum number of monitored PDCCH candidates in one span for combination (X, Y) for a single serving cell $M_{PDCCH}^{max, (X, Y), \mu}$ | | |
|---|---|---|---|
| $\mu$ | (2, 2) | (4, 3) | (7, 3) |
| 0 | 14 | 28 | 44 |
| 1 | 12 | 24 | 36 |

TABLE 4

Maximum number of monitored non-overlapping CCEs in one span for combination (X, Y) for a single serving cell (determined respectively according to SCS parameters $\mu \in \{0, 1\}$)

| | Maximum number of monitored non-overlapping CCEs in one span for combination (X, Y) for a single serving cell $M_{PDCCH}^{max, (X, Y), \mu}$ | | |
|---|---|---|---|
| $\mu$ | (2, 2) | (4, 3) | (7, 3) |
| 0 | 18 | 36 | 56 |
| 1 | 18 | 36 | 56 |

The capabilities of PDCCH monitoring and CCE monitoring described above are based on one slot or one span with a smaller granularity than the slot. As the Sub-Carrier Space (SCS) increases, the slot length is shortened. In order to keep the sum of the number of PDCCH monitoring and CCE monitoring basically unchanged within an absolute period of time, the PDCCH monitoring and CCE monitoring that the UE terminal can support in one slot decrease with the increase of SCS. When SCS is large, the number of PDCCH monitoring and CCE monitoring that the UL terminal can support in one slot may be so small that it cannot support basic PDCCH scheduling flexibility requirements or cannot support PDCCH coverage requirements. For example, when SCS=960 KHz (µ=6), the maximum number of PDCCH monitoring is not enough to support the number of PDCCH monitoring required for PDCCH scheduling system information. Adopting the capabilities of PDCCH monitoring and CCE monitoring based on a larger time granularity, such as the definition of lengths of a plurality of slot, can support more flexible PDCCH configuration, and obtain a better compromise between the time interval of PDCCH monitoring occasions and the number of PDCCH monitoring and CCE monitoring within each PDCCH monitoring occasion. For machine communication MTC (Machine-Type Control) user equipment UE (User Equipment) and NB-IOT (Narrow Band Internet of Things) and other IoT (Internet-Of-Things) UEs, in order to increase the battery life and to reduce costs, it is also possible to define the capabilities of PDCCH monitoring and CCE monitoring based on a larger time granularity, thereby to reduce the PDCCH monitoring complexity and processing capability requirements of the UE terminal. In addition to change the ability of the UE terminal to detect PDCCH/CCE, it is also possible to lower the pressure of the UE terminal to detect PDCCH and the power consumption of the UE terminal by reducing the maximum number of PDCCHs/CCEs that the UE terminal actually needs to detect.

According to an aspect of the present invention, one time length L of one reference SCS is used as a reference time granularity to define the maximum number of PDCCH monitoring and/or the maximum number of non-overlapping CCE monitoring which the UE terminal can defect in a reference time duration of length L. For example, the reference SCS is 120 KHz, and the length L of the reference time duration is the length of one slot with reference SCS=120 KHz. For the SCS exceeding 120 KHz, the maximum number of PDCCH monitoring and/or the maximum number of non-overlapping CCE monitoring of the UE terminal is determined in accordance with the reference time duration of length L. Taking the determination of the maximum number of PDCCH monitoring when SCS=960 KHz as an example, since the reference time length L corresponds to 8 slot lengths L3 of SCS=960 KHz, the reference time duration includes 8 slots of SCS=960 KHz; according to Table 1, the maximum number of PDCCH candidates for SCS=120 KHz ($\mu$=3) is 20, then, for SCS=960 KHz, the sum of the maximum number of PDCCH monitoring in the reference time duration is 20. According to an embodiment of the present invention, in order to support more various UE capabilities, UE capabilities with a reference time length of L1 can be supported, wherein L1 is an integer multiple of L or can be divisible by L. The maximum number of PDCCH monitoring and/or the maximum number of non-overlapping CCE monitoring of the UE terminal can be different for different L1.

According to an implementation, the starting point of the reference time duration is predefined. For example, the starting point of the reference time duration is the starting point of one slot of the reference SCS. For example, reference SCS=120 KHz, actual SCS=960 KHz, reference time duration length L=8 slots, the starting point of each reference time duration is slot 0, slot 8, slot 16 . . . with SCS=960 KHz, corresponding to the starting point of slot 0, 1, 2 . . . with the reference SCS=120 KHz. According to another implementation, the reference starting point of the reference time duration is configured by the base station. For example, for SCS=960 KHz, the length of the reference time duration is L=8 slots, and the reference starting point of the reference time duration is configured by the base station as the $j^{th}$ slot of the system frame SFN i. Then, the starting point of each reference time duration is the $j^{th}$ slot, the $j+8^{th}$ slot, the $j+16^{th}$ slot . . . of SFN i.

According to an implementation, the base station configures each PDCCH search space (SS), so that Type-1 CSS that is not configured based on dedicated RRC signaling (for example, Type-1 CSS configured through PDCCH-Config-common), Type-0 CSS, Type-GA CSS, and Type-2 CSS only appear in one sub-time window in one reference time duration, wherein the length of the sub-time window is L. In the reference time duration, a type of CCS among these CSSs only appears once in the reference time duration at most, and appears in a sub-time window formed by consecutive L symbols. Preferably, the sub-time window can be anywhere in the reference time duration. Preferably, the sub-time window is at a specific position in the reference time duration, for example, the starting point of the sub-time window is within the first Li symbols of the reference time duration.

According to an implementation, if there are at least two types of CSS among these CSSs in the reference time duration, the at least two types of CSS are located within the same sub-time window formed by consecutive L symbols. According to another implementation, if there are at least two types of CSS among these CSSs in the reference time duration, the at least two types of CSS may be located within at least two sub-time windows respectively, and the at least two sub-time windows may partially overlap or not overlap at all.

According to an implementation, in order to simplify the PDCCH detection of the UE, it is limited that in a reference time duration, any type of SS can only be located within one sub-time window of the reference time duration. The position and length of the sub-time window are predefined or configured by the base station. In order to increase a certain degree of flexibility, the sub-time window has a plurality of possible positions, and the actual position of the sub-time window is determined according to a predefined rule or according to a base station indication. For example, the sub-time window has position 1 and position 2. The base station may send signaling within the reference time duration i to inform the UE of the position of the sub-time window within the reference time duration i+k. For example, k=1, or k=2. If the UE receives the signaling, the PDCCH is detected according to the position of the sub-time window indicated by the signaling. If the UE does not receive the signaling, the PDCCH is detected according to the predefined sub-time window position. For example, in the case of the sub-time window with position 1 (in the $1^{st}$ slot in the reference time duration) and position 2 (in the $4^{th}$ slot in the reference time duration), if the UE does not receive the signaling, the PDCCH is detected according to position 1.

According to an implementation, the base station configures each PDCCH search space (SS), and needs to ensure that the sum of the number of PDCCH candidates for each PDCCH monitoring occasion in a reference time duration does not exceed the maximum number of PDCCH monitoring, and the sum of the number of non-overlapping CCE monitoring for each PDCCH monitoring occasion in a reference time duration does not exceed the maximum number of non-overlapping CCE monitoring. The UE terminal only needs to monitor each PDCCH candidate according to the configuration of the base station.

According to an implementation, the base station configures each PDCCH SS, and the situation that the sum of the number of PDCCH candidates for each PDCCH monitoring occasion exceeds the maximum number M of PDCCH monitoring in the reference time duration, or the situation that the number of non-overlapping CCE monitoring for each PDCCH monitoring occasion exceeds the maximum number N of non-overlapping CCE monitoring in the reference time duration may appear. Then, the UE terminal needs to determine the PDCCH candidates and CCEs to be monitored and which PDCCH candidates and CCEs to be given up monitoring according to a predefined rule. The predefined rule includes at least one of the following:

1. According to the number of slots or spans which include the number of PDCCH monitoring occasions and/or non-overlapping CCEs in the reference time duration, the maximum monitoring number M1 of PDCCH candidates in each slot or span including PDCCH monitoring occasions is determined, so that the number of PDCCH candidates in the reference time duration does not exceed M; and/or the maximum monitoring number N1 of non-overlapping CCEs in each slot or span which include the number of non-overlapping CCEs is determined, so that the number of non-overlapping CCEs in the reference time duration is not exceeds the maximum number N of non-overlapping CCE monitoring.

For example, the maximum number of PDCCH candidates in the reference time duration is 20. If the slots including PDCCH monitoring occasions in the reference time duration are 4 slots, then the maximum number of PDCCH candidates for each slot of these 4 slots is 5.

2. According to the number of PDCCH SSs in the reference time duration, the maximum monitoring number M1 of PDCCH candidates and/or the maximum monitoring number N1 of non-overlapping CCEs for each SS is determined, so that the number of PDCCH candidates in the reference time duration does not exceed the maximum number M of PDCCH monitoring, and/or the number of non-overlapping CCEs in the reference time duration does not exceed the maximum number N of non-overlapping CCE monitoring.

For example, the maximum number of PDCCH candidates in the reference time duration is 20. If the reference time duration includes two user-specific search spaces USS2 and USS1, then the maximum number of PDCCH candidates for each SS is 10.

3. According to the time sequence of the PDCCH monitoring occasions in the reference time duration, the maximum monitoring number M1 of PDCCH candidates for each PDCCH SS is determined, so that the number of PDCCH candidates in the reference time duration does not exceed the maximum number M of PDCCH monitoring, and/or the number of non-overlapping CCEs in the reference time duration does not exceed the maximum number N of non-overlapping CCE monitoring.

For example, the maximum number of PDCCH candidates in the reference time duration is 20. If two user-specific search spaces USS2 and USS1 are included in time sequence in the reference unit time, and the number of PDCCH candidates configured respectively is 12 and 10, the PDCCH monitoring occasion of the SS with the earlier time (ie, USS2) will be prioritized, that is, it is ensured that the maximum number of PDCCH candidates for USS2 is 12, and then PDCCH monitoring occasion for USS1 is allocated, so the maximum number of PDCCH candidates for USS1 is 8.

If a plurality of SSs are included in the reference time duration, and at least one SS includes a plurality of PDCCH monitoring occasions, the number of PDCCH candidates of the SS to which the PDCCH monitoring occasion with the earlier time belongs will be prioritized.

If a plurality of SSs are included in the reference time duration, and at least one SS includes a plurality of PDCCH monitoring occasions, the number of PDCCH candidates for the PDCCH monitoring occasions with the earlier time is prioritized.

For the same SS, one or more PDCCH monitoring occasions may be included in the reference time duration. According to an implementation, the number of PDCCH candidates for the PDCCH monitoring occasions with the earlier time is prioritized. According to another implementation, the number of PDCCH candidates for a plurality of PDCCH monitoring occasions of the SS is evenly allocated.

4. According to the type of PDCCH SS in the reference time duration, the maximum monitoring number M1 of each SS and/or the maximum monitoring number N1 of non-overlapping CCEs is determined, so that the number of PDCCH candidates in the reference time duration does not exceed the maximum number M of PDCCH monitoring, and/or the number of non-overlapping CCEs in the reference time duration does not exceed the maximum number N of non-overlapping CCE monitoring.

The type of PDCCH search space includes at least one of the following: common search space CSS, user-specific search space USS, PDCCH search space for scheduling system information such as Type-0 PDCCH CSS, Type-0A PDCCH CSS, PDCCH search space for receiving random access response to RAR such as Type-2 PDCCH CSS, search space of PDCCH for receiving paging such as Type-2 PDCCH CSS, other types of common search spaces such as Type-3 PDCCH CSS, and PDCCH SS including a specific type of DCI format. Corresponding to a carrier aggregation scenario, the PDCCH search space may also include carrier dimensions, such as SS of Pcell, SS of Scell, and so on.

According to an embodiment, the priority of the SS is determined according to the PDCCH SS type, and the number of PDCCH monitoring and the number of non-overlapping CCE monitoring of the SS with a higher priority are prioritized.

The priority of SS is determined according to at least one of the following manner:
 1) The common search space CSS has a higher priority than the user-specific search space USS
 2) Type-0 PDCCH CSS has the highest priority
 3) Type-0/Type GA PDCCH CSS has the highest priority
 4) Type-0, Type GA, Type-1 PDCCH CSS, and Type-2 PDCCH CSS have higher priority than Type-3 CSS.
 5) The CSS with a low CSS index has a higher priority than the CSS with a high CSS index in one cell
 6) Each CSS has the same priority in one cell
 7) Each Type 3 CSS has the same priority in one cell
 8) The SS of the primary cell (Pcell) has a higher priority than the SS of the secondary cell (Scell)
 9) The USS of the primary cell has a higher priority than the USS of the secondary cell
 10) The USS with a low USS index has a higher priority than the USS with a high USS index in one cell
 11) Each USS has the same priority in one cell 12) The search space configured with a specific downlink control information DCI format has a higher priority than search spaces configured with other DCI formats.

For example, the maximum number of PDCCH candidates in the reference time duration is 20. The reference time duration includes CSS1 and USS1, and the number of PDCCH candidates configured respectively is 12 and 10. In the case of priority rule 1), the number of PDCCH candidates of the CSS1 with high priority is prioritized to be 12, and then it is allocated to USS1, so the number of PDCCH candidates of USS1 is 8.

According to an embodiment, different scaling factors X are configured for different priorities to control the number of PDCCH candidates of SSs with different priorities. For SSs with the same priority, the same scaling factor is configured to reduce the number of PDCCH candidates in equal proportions, or the number of PDCCH candidates for each SS is determined in turn in accordance with other rules.

5. According to the type of PDCCH SS and the number of PDCCH SSs in the reference time duration, the maximum monitoring number M1 of PDCCH candidates and/or the maximum monitoring number N1 of non-overlapping CCEs for each SS are determined, so that the number of PDCCH candidates in the reference time duration does not exceed the maximum number M of PDCCH monitoring, and/or the number of non-overlapping CCE in the reference time duration does not exceed the maximum number N of non-overlapping CCE monitoring.

For example, the priority of each SS is determined in accordance with the method of rule 4. For SSs with the same priority, such as a plurality of USSs, the number of PDCCH candidates for the USS is reduced in proportion in accordance with the number of these USSs.

6. According to the type of PDCCH SS in the reference time duration and the time sequence of the PDCCH monitoring occasions in the reference time duration, the maximum monitoring number M1 of PDCCH candidates and/or the maximum monitoring number N1 of non-overlapping CCEs are determined for each PDCCH search space SS, so that the number of PDCCH candidates in the reference time duration does not exceed the maximum number M of PDCCH monitoring, and/or the number of non-overlapping CCEs in the reference time duration does not exceed the maximum number N of non-overlapping CCE monitoring.

For example, the priority of each SS is determined in accordance with the method of Rule 4. For SSs with the same priority, such as a plurality of USS positions, the number of PDCCH candidates for each USS position is determined in time sequence. For example, the maximum number of PDCCH candidates in the reference time duration is 20. The CSS1, USS1 and USS2 are included in the reference time duration, the number of PDCCH candidates configured respectively is 12, 10 and 10. The number of PDCCH candidates is prioritized with 12 for the CSS1 with high priority, and then it is allocated for the USS with low priority. Since the time of USS2 is earlier, the number of candidates preferentially allocated to USS2 is 8, and the UE does not need to monitor USS1.

7. According to the PDCCH SS type in the reference time duration and the number of slots or spans including the PDCCH monitoring occasions for each SS in the reference time duration, the maximum monitoring number M1 of PDCCH candidates for each SS is determined, so that the number of PDCCH candidates in the reference time duration does not exceed the maximum number M of PDCCH monitoring, and/or the number of non-overlapping CCEs in the reference time duration does not exceed the maximum number N of non-overlapping CCE monitoring.

According to an aspect of the present application, in addition to considering that the maximum number of PDCCH monitoring and the maximum number of non-overlapping CCE monitoring in each time unit cannot exceed the maximum value, it is also necessary to consider that in adjacent time units, within a predefined time range, the number of PDCCH monitoring and the number of non-overlapping CCE monitoring to be detected cannot exceed a predefined value. Or, in two adjacent time units, the time interval between PDCCH MOs located in different time units cannot be too small, for example, the interval between the end position of PDCCH MO1 in the previous time unit and the starting point of PDCCH M02 in the next time unit cannot be less than the predefined threshold. Through such restriction, it can be ensured that not only the PDCCH detection in one time unit does not exceed the UE capability, but also the PDCCH detection during a certain time period spanning two time units does not exceed the UE capability.

Preferably, the interval between any two SS positions that do not partially overlap or not completely overlap is not less than a predefined threshold Th1.

Preferably, the interval between the SS positions located in 2 adjacent time units is not less than the predefined threshold Th2.

For example, the first time unit includes slots 0~7, and the second time unit includes slots 8~15. The interval between the SS positions located in two adjacent time units is not less than the predefined threshold Th2=1 slot. If there is one PDCCH MO in the slot 8 of the second time unit, the base station cannot configure another PDCCH MO in the slot 7. Vice versa, if there is one PDCCH MO in the slot 7 of the first time unit, the base station cannot configure another PDCCH MO in the slot 8.

Preferably, for the first type of SS, the interval between any two SS positions that do not partially overlap or not completely overlap is not less than the predefined threshold Th3.

Preferably, for the first type of SS, the interval between the SS positions located in 2 adjacent time units is not less than the predefined threshold Th4.

Preferably, the interval between the second type of SS and the first type of SS is not limited.

For example, the first time unit includes slots 0~7, and the second time unit includes slots 8~15. The interval between the first type of SS position located in 2 adjacent time units is not less than the predefined threshold Th4=1 slot. If there is one PDCCH MO of the first type of SS in the slot 8 of the second time unit, the base station cannot configure one PDCCH MO of the first type of SS in the slot 7, but the base station can configure one PDCCH MO of the second type of SS in the slot 7.

Preferably, the interval between the second type of SS and the first type of SS is not less than a predefined threshold Th5. The threshold Th5 and the threshold Th4 or Th3 are independent thresholds. Preferably, the threshold Th5 is less than or equal to the threshold Th4 or Th3.

For example, the first time unit includes slots 0~7, and the second time unit includes slots 8~15. The interval between the first type of SS position located in two adjacent time units is not less than the predefined threshold Th4=2 slots, and the interval between the first type of SS and the second type of the SS position located in two adjacent time units is not less than the predefined threshold Th5=1 slot. If there is one PDCCH MO of the first type of SS in the slot 8 of the second time unit, the base station cannot configure one PDCCH MO of the first type of SS in the slot 6, and the base station cannot configure the PDCCH MO of the second type of SS in the slot 7, but the base station can configure the PDCCH MO of the second type of SS in the slot 6.

Preferably, the first type of SS is at least one of Type-1 CSS, Type-3 CSS, and UE SS configured by dedicated RRC signaling.

Preferably, the second type of SS is at least one of Type-1 CSS that is not configured based on dedicated RRC signaling (for example, Type-1 CSS configured through PDCCH-Configcommon), Type-0 CSS, Type-OA CSS, Type-2 CSS.

In order to increase the flexibility of configuring the PDCCH MO, the interval between the SSs in adjacent reference time durations may not be limited, but the UE needs to reduce the number of PDCCH monitoring and the number of non-overlapping CCE monitoring according to predefined rules, so that the UE can ensure the detection for important PDCCH. For example, the interval between the second type of SS and the first type of SS in adjacent unit time is not limited, or the interval between two SSs in adjacent unit time is not limited, but the UE needs ensure the detection of the PDCCH MO of the SS with high priority. The priority is determined according to at least one of the following manners:
   (1) The priority of the second type of SS is higher than the priority of the first type of SS.
   (2) The priority of the first type of SS is higher than the priority of the second type of SS.
   (3) The priority of the SS with the early time resource is higher than the priority of the SS with the late time resource.
   (4) The priority of the SS with the late time resource is higher than the priority of the SS with the early time resource.

According to an aspect of the present application, the UE supports PDCCH repetition transmission (PDCCH repetition sending). The SS set(s) for multiple repetition transmissions of one PDCCH is called one SS bundle, and the SS bundle includes a plurality of PDCCH MOs (or called SS regions). A plurality of PDCCH MOs or SS regions for a SS bundle are associated with the same beam direction, for example, this effect is achieved by being associated with the same Transmission Configuration Indicator (TCI), or a plurality of PDCCH MOs or SS regions for a SS bundle are associated with different beam directions, for example, this effect is achieved by being associated with different TCIs. Alternatively, a plurality of PDCCH MOs or SS regions for one SS bundle belong to the same SS set. Alternatively, a plurality of PDCCH MOs or SS regions for a SS bundle belong to different SS sets. Alternatively, one SS set is associated with one CORESET, or one SS set is associated with a plurality of CORESETs. Through the above manner, it is possible to more flexibly support the resource configuration of PDCCH repetition transmission in a single or multiple TRP scenarios.

If a plurality of PDCCH MOs or SS regions for one SS bundle belong to different SS sets, and each SS set is respectively associated with one CORESET, it is necessary to determine which PDCCH transmissions in different SS sets belong to the multiple repetition transmissions of the same PDCCH according to predefined rules. In order to control the time delay of repetition transmissions of the same PDCCH, control the PDCCH blind detection complexity, and reduce PDCCH blocking, the PDCCH repetition transmission mapping time window A can be defined, and the PDCCH transmission for each SS set in one SS bundle within the time window A is associated according to a predefined rule to determine which PDCCH transmissions belong to multiple repetition transmissions of the same PDCCH.

Alternatively, the parameters of time window A are configured by the base station. The base station can configure at least one of the starting point, time length, and period of time window A. The starting point of time window may be determined based on at least one of the reference point and the offset. For example, the starting point of time window may be determined according to an offset relative to the reference point with a predefined time point as a reference point. According to an embodiment, the reference point may be system frame 0, or a time reference point configured by the base station.

Alternatively, the parameters of time window A are determined by the parameters of a plurality of SS sets in one SS bundle. The parameters of time window A are determined by at least one of the period and/or the time offset of a plurality of SS sets. For example, the time length of time window A is determined by the least common multiple of the periods of a plurality of SS sets; or by the greatest common divisor of the periods of a plurality of SS sets; or by one SS set of a plurality of SS sets, for example, the one SS set is the SS set with the largest or smallest period, or the one SS set is the SS set with the smallest or largest SS set index, or the one SS set is the SS set with the smallest or largest corresponding CORESET index. In a specific example, the period of a plurality of SS sets in one SS bundle must be the same. For example, the starting point of time window A is determined according to a predefined reference point, or the starting point of time window A is determined according to the starting point of each SS set in one SS bundle.

Figure 4:
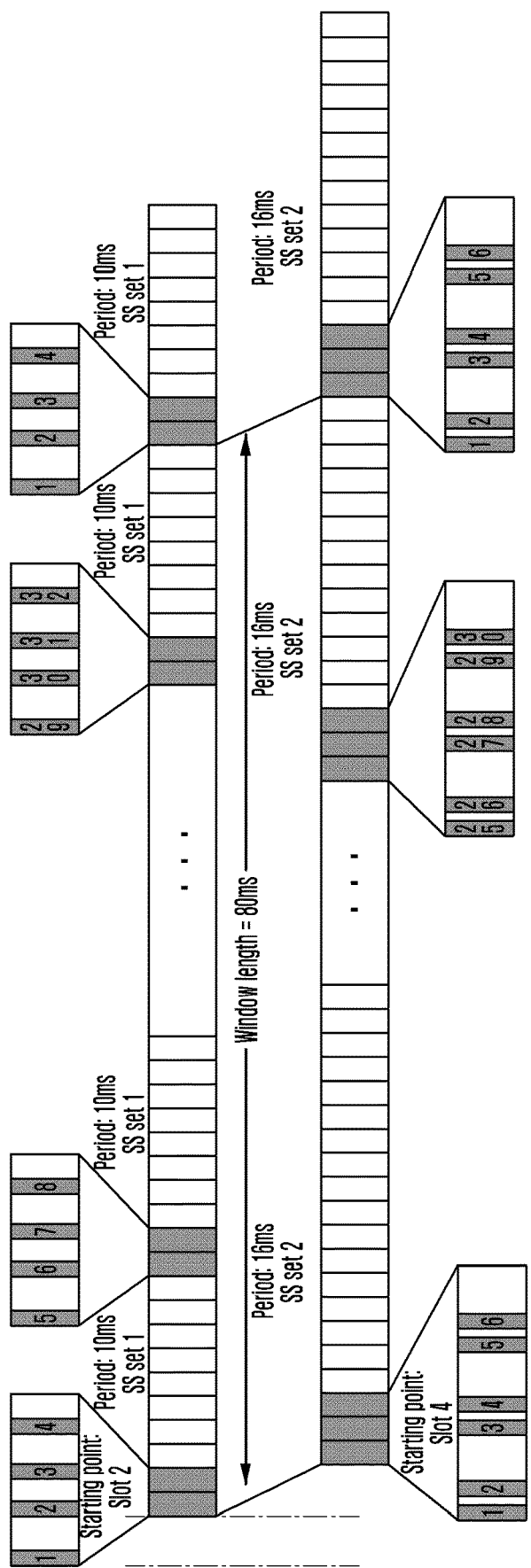
FIG. 4 illustrates an example of time window A according to an embodiment of the present application.

For example, one PDCCH includes 2 repetition transmissions from SS set1 and SS set2 respectively. The time length of time window A is determined by the least common multiple of the period of 2 SS sets. The starting point of time window A is determined according to the starting point of the k*N+1th period of SS set1 and/or SS set2, where N is the number of periods of one corresponding SS set in the length of one time window A, and k=0, 1, . . . . FIG. 4 illustrates an example of time window A according to an embodiment of the present application. In FIG. 4, the period of SS set1 includes 10 slots, and the time offset is 2 slots, that is, the starting point of the PDCCH monitoring slot of SS set1 is slot 2, 12, 22, . . . , and there are one or more PDCCH MOs in every 10 slots from the beginning of these starting points. The period of SS set2 includes 16 slots, and the time offset is 4 slots, that is, the starting point of the PDCCH monitoring slot of SS set2 is slot 4, 20, 36, . . . , and there are one or more PDCCH MOs in every 16 slots from the beginning of these starting points. SS set1 has 2 PDCCH MOs in slots 2, 3, 12, 13, . . . 72, and 73 respectively, and the counts are 1, 2, . . . 32; SS set2 has 2 PDCCH MOs in slots 4, 5, 6, 20, 21, 22, . . . 68, 69, and 70 respectively, and the counts are 1, 2, . . . 30. According to the least common multiple of the periods of SS set1 and SS set2, the length of time window A is determined to be 80 slots. Then, for SS set1, the number N of periods in time window A is 8, and the starting point of time window A is the starting point of the 8k+1th period of SS set1, that is, the starting point of the $1^{st}$, $9^{th}$ period, . . . . The $1^{st}$ period is relative to the time reference point such as the starting point of system frame 0. For SS set2, the number N of periods in time window A is 5, and the starting point of time window A is the starting point of the 5k+1th period of SS set2, that is, the starting point of the $1^{st}$, 6th period, . . . . The 1$^{st}$ period is the starting point relative to the time reference point such as system frame 0. In every 80 slots, the PDCCH of the PDCCH monitoring position of the PDCCH MO in SS set1 and its adjacent SS set2 is the repetition transmission of the same PDCCH, that is, one PDCCH can repeat transmission in the PDCCH MO with the same PDCCH MO count in two SS sets.

Figure 5:
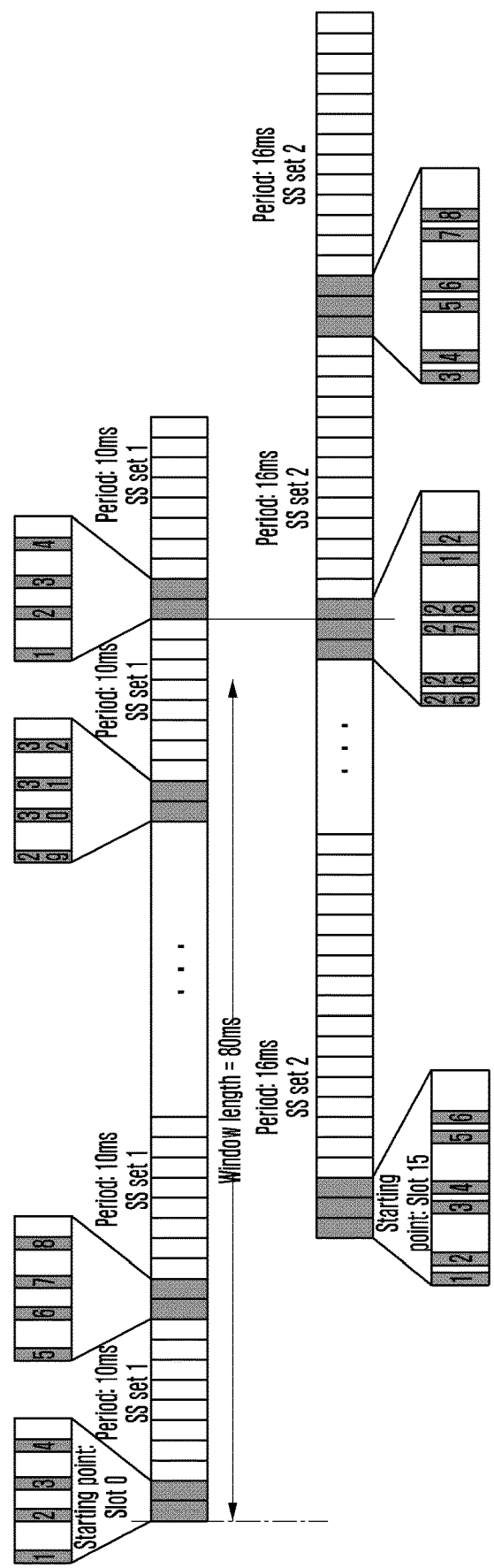
FIG. 5 illustrates another example of time window A according to an embodiment of the present application.

For example, one PDCCH includes 2 repetition transmissions from SS set1 and SS set2 respectively. The time length of time window A is determined by the least common multiple of the periods of 2 SS sets. The starting point of time window is determined according to the starting point of one of the SS sets, for example, according to the starting point of the k*N+1th period of SS set1, where N is the number of periods of one corresponding SS set in a length of one time window A, k=0, 1 . . . . FIG. 5 illustrates another example of time window A according to an embodiment of the present application. In FIG. 5, the period of SS set1 includes 10 slots, and the time offset is 0 slots, that is, the starting point of the PDCCH monitoring slot of SS set1 is slot 0, 10, 20, . . . , and there are one or more PDCCH MOs in every 10 slots from the beginning of these starting points. The period of SS set2 includes 16 slots, and the time offset is 15 slots, that is, the starting point of the PDCCH monitoring slot of SS set2 is slot 15, 31, 47, . . . , and there are one or more PDCCH MOs in every 16 slots from the beginning of these starting points. According to the least common multiple of the periods of SS set1 and SS set2, the length of time window A is determined to be 80 slots. Then, the number of periods of SS set1 in time window A is 8, and the starting point of time window is the starting point of the 8k+1th period, that is, the starting point of the 1$^{st}$, 9$^{th}$ period, . . . . The 1$^{st}$ period is relative to the time reference point such as the starting point of system frame 0. SS set1 has 2 PDCCH MOs in slots 0, 1, 10, 11, . . . 70, and 71 respectively, and the counts are 1, 2, . . . 32. SS set2 has 2 PDCCH MOs in slots 15, 16, 17, 31, 32, 33, . . . 79, 80, and 81 respectively. Since the end position of one time window is slot 79, the PDCCH MO starting at slot 80 is used as the MO of the next time window to restart counting. Therefore, the PDCCH MO counts of SS set2 in slot 15, 16, 17, 31, 32, 33, . . . 79, 80, and 81 are 1, 2, . . . 28, 1, 2. In every 80 slots, the PDCCH of the PDCCH monitoring position of the PDCCH MO in SS set1 and its adjacent SS set2 is the repetition transmission of the same PDCCH, that is, one PDCCH can repeat transmission in the PDCCH MO with the same PDCCH MO count in two SS sets.

Figure 6:
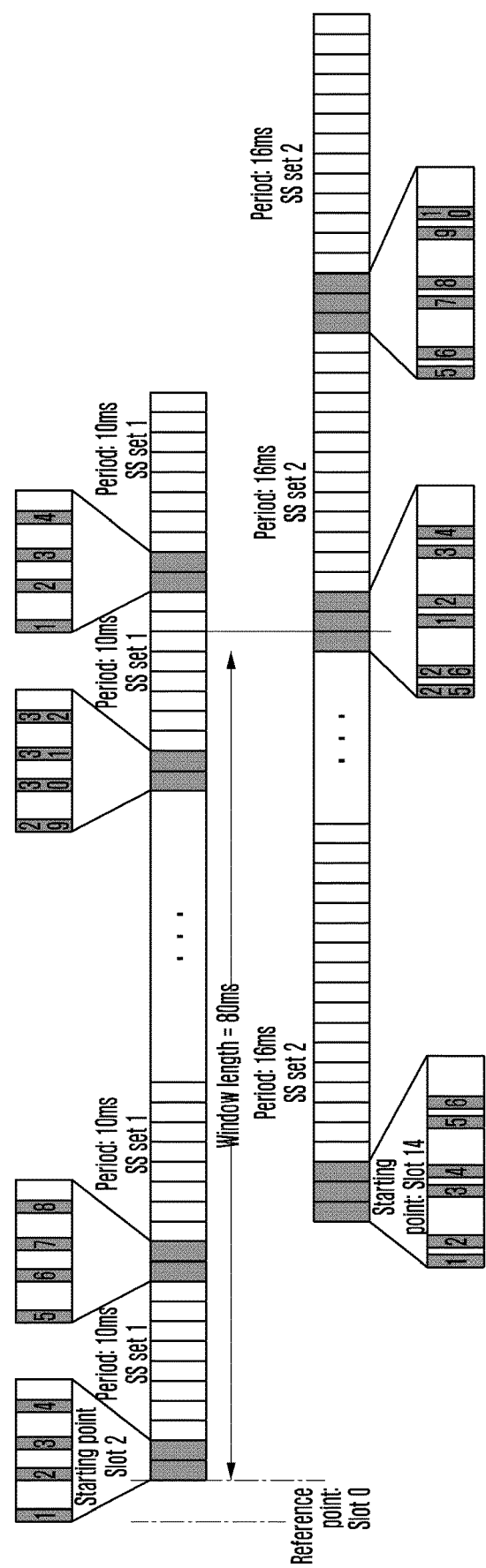
FIG. 6 illustrates another example of time window A according to an embodiment of the present application.

For example, one PDCCH includes 2 repetition transmissions from SS set1 and SS set2 respectively. The time length of time window A is determined by the least common multiple of the period of 2 SS sets. The starting point of time window is determined according to a predefined reference time point, such as the starting point of slot 0 of system frame 0. FIG. 6 illustrates another example of time window A according to an embodiment of the present application. Thereof, the period of SS set1 includes 10 slots, and the time offset is 2 slots, that is, the starting point of the PDCCH monitoring slot of SS set1 is slot 2, 12, 22, . . . , and there are one or more PDCCH MOs in every 10 slots from the beginning of these starting points. The period of SS set2 is 16 slots, and the time offset is 14 slots, that is, the starting point of the PDCCH monitoring slot of SS set2 is slot 14, 30, 46, . . . , and there are one or more PDCCH MOs in every 16 slots from the beginning of these starting points. According to the least common multiple of the periods of SS set1 and SS set2, the length of time window A is determined to be 80 slots. Then, the number of periods of SS set1 in time window A is 8, and the starting point of time window is the starting point of the 8k+1th period, that is, the starting point of the 1$^{st}$, 9$^{th}$ period . . . . The 1$^{st}$ period is relative to the time reference point, such as the starting point of system frame 0. SS set1 has 2 PDCCH MOs in slots 2, 3, 12, 13, . . . 72, and 73 respectively, and the counts are 1, 2, . . . 32. SS set2 has 2 PDCCH MOs in slots 14, 15, 16, 30, 31, 32, . . . 78, 79, and 81 respectively. According to the least common multiple of the periods of SS set1 and SS set2, the length of time window A is determined to be 80 slots. The starting point of time window is the starting point of slot 0 of system frame 0. SS set1 has 2 PDCCH MOs in slots 2, 3, 12, 13, . . . 72, and 73 respectively, and the counts are 1, 2, . . . 32. SS set2 has two PDCCH MOs in slots 14, 15, 16, 30, 31, 32, . . . 78, 79, and 80 respectively. Since the end position of one time window is slot 79, the PDCCH MO starting at slot 80 is used as the MO of the next time window to restart counting. Therefore, the PDCCH MO counts of SS set2 in slot 15, 16, 17, 31, 32, 33, . . . 79, 80, and 81 are 1, 2, . . . 28, 1, 2, respectively. In every 80 slots, the PDCCH of the PDCCH monitoring position of the PDCCH MO in SS set1 and its adjacent SS set2 is the repetition transmission of the same PDCCH, that is, one PDCCH can repeat transmission in the PDCCH MO with the same PDCCH MO count in two SS sets.

For example, one PDCCH includes 2 repetition transmissions from SS set1 and SS set2 respectively. The length of time window A is configured by the base station. The starting point of time window is determined according to a predefined reference time point, such as the starting point of slot 0 of system frame 0. An example is given, assuming that the period of SS set1 is 10 slots and the time offset is 2 slots, that is, the starting point of the PDCCH monitoring slot of SS set1 is slot 2, 12, 22, . . . , and there are one or more PDCCH MOs in every 10 slots from the beginning of these starting points. The period of SS set2 is 16 slots, and the time offset is 14 slots, that is, the starting point of the PDCCH monitoring slot of SS set2 is slot 14, 30, 46, . . . , and there are one or more PDCCH MOs in every 16 slots from the beginning of these starting points. The length of time window configured by the base station is assumed to be 40 ms. Then, the starting point of time window is slot 0, 40, 80 . . . . SS set1 has 2 PDCCH MOs in slots 2, 3, . . . 42, 43, 52, 53, . . . , and the counts are 1, 2, 3, 4 . . . , 13, 14, 15, 16, 1, 2, 3, and 4. SS set2 has 2 PDCCH MOs in slots 14, 15, 16, 30, 31, 32, . . . 46, 47, 48 . . . respectively. The PDCCH MOs count as 1, 2, 3, 4, 5, 6, 7, 8, 9, 10, 11, 12 . . . 1, 2, 3, and 4. In every 40 slots, the PDCCH of the PDCCH monitoring position of the PDCCH MO in SS set1 and its adjacent SS set2 is the repetition transmission of the same PDCCH, that is, one PDCCH can repeat transmission in the PDCCH MO with the same PDCCH MO count in two SS sets.

Within one time window A, if the numbers of PDCCH MOs of a plurality of SS sets in one SS bundle are not equal, the PDCCH MOs that can be used for PDCCH repetition transmission are determined in accordance with the smallest number of PDCCH MOs. Preferably, the remaining PDCCH MO is only used for single PDCCH transmission. Preferably, the remaining PDCCH MOs are not used for PDCCH transmission, that is, UE may not monitor these PDCCH MOs. For example, in FIG. 4, within one time window, SS set1 has 2 more PDCCH MOs than SS set2, and these two PDCCH MOs (PDCCH MO 31, 32) cannot be used for PDCCH repetition transmission, or cannot be used for PDCCH transmission.

According to another implementation, in order to reduce the time interval between multiple repetitions of the same PDCCH and reduce the PDCCH MO that cannot be used for PDCCH repetition transmission, the configuration of a plurality of SS sets in one SS bundle should have certain restrictions. The restrictions can be configured by the base station or predefined. The restriction includes at least one of the following:

(1) The periods of a plurality of SS sets in one SS bundle are the same.
(2) Within one time window, the number of PDCCH MOs of the plurality of SS sets in one SS bundle is the same.
(3) Within one time window, the time difference between the starting points of the plurality of SS sets in one SS bundle is less than a predefined threshold.
(4) The periods of the plurality of SS sets in one SS bundle are the same, and the slots that include the PDCCH MO in one period are the same.

Preferably, the plurality of SS sets in one SS bundle number PDCCH MOs in each PDCCH MO slot, and the PDCCH MOs with the same PDCCH MO number in one slot are used as a PDCCH repetition transmission position. If the base station configures PDCCH repetition transmission for the UE, a plurality of PDCCH SSs in one reference time duration may belong to the same SS bundle or belong to different SS bundles. The UE determines the number of slots or spans of PDCCH monitoring occasions of each SS according to the SS bundle to which each PDCCH SS in the reference time duration belongs.

According to an implementation, one or more SSs that belong to the same SS bundle are processed as a whole. Alternatively, according to a predefined rule, one SS in one SS bundle is selected as the priority of reference SS. For example, the SS with the lowest SS index in one SS bundle is selected as the reference SS index of the SS bundle. For another example, the SS with the lowest CORESET index in one SS bundle is selected as the CORESET index of reference SS of the SS bundle. According to an example, 3 PDCCH SS sets are included in one reference time duration, and these 3 PDCCH SS sets are all USS, where PDCCH SS set1 and PDCCH SS set3 belong to SS bundle 1, PDCCH SS set2 belongs to SS bundle 2, and SS bundle 2 supports a maximum repetitions number of 1 (here for convenience of description, the SS with repetition number=1 is also called SS bundle). It is assumed that the sum of the maximum monitoring number M1 of the 3 PDCCH SS sets and/or the maximum monitoring number N1 of non-overlapping CCEs exceeds the maximum number M of PDCCH monitoring and/or the maximum number N of non-overlapping CCE monitoring. According to method 4, the USS with a low USS index is higher than the USS with a high USS index. Since PDCCH SS set1 and SS set3 belong to the same SS bundle, the index of PDCCH SS set1 is lower than SS set2. Therefore, the priority of SS set1 and SS set3 for a SS bundle where PDCCH SS set1 is located is higher than that of SS set2, and the number of PDCCH monitoring and/or the number of non-overlapping CCEs of SS set1 and SS set3 are prioritized. The PDCCH monitoring of SS set2 is abandoned, or the number of PDCCH monitoring and/or the number of non-overlapping CCEs of the SS is reduced, so that the number of PDCCH candidates in the reference time duration does not exceed the maximum number M of PDCCH monitoring, and/or the number of non-overlapping CCEs in the reference time duration does not exceed the maximum number N of non-overlapping CCE monitoring.

According to another implementation, the priority of the SS of each SS bundle is determined according to the length of each SS bundle. For example, 3 PDCCH SS sets are included in one reference time duration, where PDCCH SS set1 and PDCCH SS set3 belong to SS bundle 1, and the SS bundle 1 supports a maximum repetitions number of 2; the PDCCH SS set2 belongs to SS bundle 2, and the SS bundle 2 supports a maximum repetitions number of 1. If the sum of the maximum monitoring number M1 of the 3 PDCCH SS sets and/or the maximum monitoring number N1 of non-overlapping CCEs exceeds the maximum number M of PDCCH monitoring and/or the maximum number N of non-overlapping CCE monitoring, the number of PDCCH monitoring and/or the number of non-overlapping CCEs of SS of each SS bundle with the longer SS bundle length are prioritized. For the SS of SS bundle with a shorter SS bundle length, the PDCCH monitoring of the SS is abandoned, or the number of PDCCH monitoring and/or the number of non-overlapping CCEs of the SS is reduced, so that the number of PDCCH candidates in the reference time duration does not exceed the maximum number M of PDCCH monitoring, and/or the number of non-overlapping CCEs in the reference time duration does not exceed the maximum number N of non-overlapping CCE monitoring. This manner is conducive to the robustness of PDCCH detection. Or, the number of PDCCH monitoring and/or the number of non-overlapping CCEs of the SS of SS bundle with a shorter SS bundle length are prioritized, and for the SS of SS bundle with a longer SS bundle length, the PDCCH monitoring of the SS is abandoned, or the number of PDCCH monitoring and/or the number of non-overlapping CCEs of the SS is reduced, so that the number of PDCCH candidates in the reference time duration does not exceed the maximum number M of PDCCH monitoring, and/or the number of non-overlapping CCEs in the reference time duration does not exceed the maximum Number N of non-overlapping CCE monitoring. This manner can support more flexible PDCCH resource allocation.

According to an aspect of the present application, the base station may configure a plurality of carriers for the UE. The base station may configure the PDCCH of each carrier respectively. For example, on some carriers, the PDCCH repetition transmission is configured, and on some carriers, the PDCCH repetition transmission is not configured. The maximum number of PDCCH monitoring and/or the number of non-overlapping CCEs of a carrier can be weighted according to whether this carrier is configured with the PDCCH repetition transmission. For example, if the PDCCH repetition transmission is configured on a carrier, the maximum number of PDCCH monitoring for the UE on this carrier is $r1*M_{PDCCH}^{max,slot,\mu}$. If PDCCH repetition transmission is not configured on a carrier, the maximum number of PDCCH monitoring for the UE on this carrier is $r2*M_{PDCCH}^{max,slot,\mu}$, where the values of r1 and r2 can be determined respectively.

The base station configures the UE to receive the PDCCH according to which capability of PDCCH monitoring and/or non-overlapping CCE monitoring. According to an implementation, the base station configures the UE to receive the PDCCH according to which monitoring capability for each BWP respectively. Or, the base station configures the UE to receive the PDCCH according to which monitoring capability for each search space group respectively. Or, the base station configures the UE to receive the PDCCH according to which monitoring capability for each search space or CORESET respectively. According to an implementation, the base station configures that according to which monitoring capability to receive PDCCH from a given time point. For example, the base station indicates the UE to receive PDCCH according to which monitoring capability through MAC signaling or physical layer signaling, and according to the time resource where the signaling is located and the predefined time delay, determines which time point the UE starts receiving PDCCH from according to the monitoring capability indicated by the signaling. For example, from the time unit (symbol, slot, subframe, reference time duration of the maximum PDCCH monitoring and non-overlapping CCE monitoring) at the end position of the physical channel carrying the signaling+the first time unit of time delay δ (reference time duration, symbol, slot, subframe, PDCCH MO), the UE starts receiving PDCCH in accordance with the monitoring capability indicated by the signaling.

According to another aspect of the present invention, in order to reduce the burden of PDCCH monitoring/non-overlapping CCE monitoring, the time resource occupied by one PDCCH is extended in the time dimension, and the maximum number of PDCCH monitoring/non-overlapping CCEs within one slot/span is extended to the maximum number of PDCCH monitoring/non-overlapping CCEs within the time resource range occupied by one PDCCH. For example, the time length of CORESET is extend from 3 symbols to 6 symbols, or more symbols. A CORESET can include non-consecutive N symbols and can be located in different slots. For example, CORESET includes 12 symbols, which are respectively located in the first 3 symbols of each slot of the consecutive 4 slots. One PDCCH is mapped into these 12 symbols, and the time length is extended to 4 slots. Or, a PDCCH is mapped onto a plurality of PDCCH MOs. For example, the length of CORESET in each MO is 3 symbols, and one PDCCH is mapped to 4 PDCCH MOs, which are respectively located in the first 3 symbols of each slot of the consecutive 4 slots. The PDCCH is mapped into these 12 symbols, and the time length is extended to 4 slots.

DMRS is inserted into the time resource of PDCCH in accordance with to a predefined time interval. For example, the DMRS is inserted in accordance with the number of symbols corresponding to one CCE as a time interval, that is, the DMRS of only one symbol included in each CCE. Or, in the time resource of PDCCH, the DMRS is inserted only in the time resource of the first CCE, and the DMRS is not included in other time resources. Other time resources share the same DMRS symbol with the time resource of the first CCE. In this way, the number of channel estimations required by the UE per unit time can be reduced.

To reduce the maximum number of detecting PDCCHs/non-overlapping CCEs that the UE can support can be considered as a static method for reducing the number of PDCCHs/non-overlapping CCEs detected by the UE terminal. Another method for reducing the number of PDCCHs/non-overlapping CCEs detected by the UE terminal can dynamically or semi-statically determine the number of PDCCHs/non-overlapping CCEs to be detected by the UE terminal according to predefined rules or signaling indications. In this way, the pressure on the UE terminal to detect the PDCCH can be reduced more flexibly according to the actual situation. For example, when the traffic volume is low, or the probability of PDCCH blocking is low, the base station may indicate the UE to detect fewer PDCCHs/non-overlapping CCEs, thereby reducing the power consumption of the UE. Or, when the UE reports overheating, the base station may indicate the UE to detect fewer PDCCHs/non-overlapping CCEs, thereby reducing the power consumption of the UE.

The UE determines the information of the maximum number of PDCCH monitoring/non-overlapping CCE monitoring by the UE based on the indication sent by the base station. According to an implementation, the UE receives the indication through physical layer signaling or MAC layer signaling. For example, the base station configures the maximum number of PDCCHs and/or the maximum number of non-overlapping CCEs to be monitored by a plurality of UEs, and indicates the maximum number of PDCCHs and/or the maximum number of non-overlapping CCEs to be monitored by one of the UEs through physical layer signaling or MAC layer signaling.

Example 1: The base station configures N tables, such as configuration Table 1 and Table 1', which are used to indicate the maximum number of PDCCHs and/or the maximum number of non-overlapping CCEs to be monitored by the N sets of UEs, and in the PDCCH, the base station instructs the UE according to which table to determine the maximum number of PDCCHs and/or the maximum number of non-overlapping CCEs to be monitored by the UE. As an example, the following Table 1' only includes the maximum number of PDCCHs, but the content of Table 1' is not limited to this. Table 1' can only include the maximum number of non-overlapping CCEs, or Table 1' can include both the maximum number of PDCCHs and the maximum number of non-overlapping CCEs.

TABLE 1'

Maximum number of monitored PDCCH candidates per slot for a single serving cell (determined respectively according to SCS parameters $\mu \in \{0, 1, 2, 3\}$

| $\mu$ | Maximum number of monitored PDCCH candidates per slot for a single serving cell $M_{PDCCH}^{max,\ slot,\ \mu}$ |
|---|---|
| 0 | 36 |
| 1 | 22 |
| 2 | 20 |
| 3 | 16 |

Example 2: The base station configures N scaling factors, for example, configures two scaling factors {A, B}, the base station indicates one of the scaling factors in the PDCCH, and the UE determines the maximum number of PDCCHs and/or the maximum number of non-overlapping CCEs to be monitored according to the scaling factors and the default Table 1.

Example 3: The base station configures the number of PDCCH candidates for each search space and configures N different scaling factors, for example, configures two scaling factors {A, B}, the base station indicates one of the scaling factors in the PDCCH, and the UE determines the number of PDCCH candidates for each search space according to the scaling factors and the number of PDCCH candidates for each search space configured by the base station. Alternatively, the scaling factor is only applicable to the first type of search space, and not applicable to the second type of search space.

The second type of search space is at least one of the following search spaces:
 The common search space located in the Type-0 PDCCH
 The common search space located in the Type-GA PDCCH
 The common search space located in the Type-1 PDCCH
 The common search space located in the Type-2 PDCCH
 The common search space located in the Type-3 PDCCH
 The search space configured of a specific DCI format.

The specific DCI format is, for example, a DCI format used to indicate the information for determining the number of PDCCHs/CCEs detected by the UE.

Example 4: The base station configures N scaling factors and M tables, for example, configures 2 scaling factors {A, B}, the base station indicates one of the scaling factors and one of the tables in the PDCCH, and the UE determines the maximum number of PDCCHs and/or the maximum number of non-overlapping CCEs to be monitored according to the scaling factors and the tables.

Alternatively, when the base station configures M SS sets, and each SS set includes one or more SSs, the UE determines the number of PDCCH candidates and the number of non-overlapping CCEs to be monitored based on the scaling factors separately configured for each SS set and/or the maximum number of PDCCHs and/or the maximum number of non-overlapping CCEs to be monitored by the UE separately configured for each SS set by the base station. If the scaling factor is not configured, the default scaling factor is 1. For example, the base station configures two SS sets, SS set 1 includes SS1 and SS2, and SS set 2 includes SS2 and SS3. The base station configures the scaling factor of SS set 1 as X1, and the scaling factor of SS set 2 as X2. Then, when the base station indicates the UE to monitor SS set 1, the UE determines the number of PDCCH candidates for each search space of SS1 and SS2 according to the scaling factor X1. When the base station indicates the UE to monitor SS set 2, the UE determines the number of PDCCH candidates for each search space of SS2 and SS3 according to the scaling factor X2.

According to an aspect of the present application, in order to reduce the probability of PDCCH blocking, such as the impact of PDCCH blocking caused by reducing the number of PDCCH candidates or the impact of PDCCH blocking caused by PDCCH repetition, the base station may configure parameters for determining the starting points of PDCCH candidate to be monitored.

The following Formula (1) is used to determine the starting point of PDCCH candidate to be monitored.

$$L \cdot \left\{ \left( Y_{p,n_{s,f}}^{\mu} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i \quad (1)$$

(1) The base station configures the minimum value of $m_{s,n_{CI}}$.

For example, in Formula (1), if the minimum value of m is not configured, $m_{s,n_{CI}}=0, \ldots, M_{s,n_{CI}}^{(L)}-1$, where $M_{s,n_{CI}}^{(L)}$ is the number of PDCCH candidates for the configured search space s, carrier nci, and AL=L. If the minimum value of $m_{s,n_{CI}}$ is configured, the value of $m_{s,n_{CI}}$ starts from $M_{s,n_{CI}offset}^{(L)}$, for example, $m_{s,n_{CI}}=M_{s,n_{CI}offset}^{(L)}, \ldots, M_{s,n_{CI}}^{(L)}-1$.

In an implementation, the base station configures the minimum values of $m_{s,n_{CI}}$, and the number of PDDCH candidates to be monitored is $M_{s,n_{CI}}^{(L)}-M_{s,n_{CI}offset}^{(L)}+1$. In another implementation, the base station configures the minimum values of $m_{s,n_{CI}}$, and configures the scaling factor. The number of PDCCH candidates to be monitored is determined as $X*M_{s,n_{CI}}^{(L)}$ by scaling factor. So $m_{s,n_{CI}}=M_{s,n_{CI}offset}^{(L)}, \ldots, X\cdot M_{s,n_{CI}}^{(L)}-1$.

(2) If the base station configures PDCCH repetition transmission, the PDCCH candidate position index in each SS region where multiple repeated samples of a PDCCH are located respectively meets the predefined relationship. Alternatively, the base station respectively configures the minimum values $M_{s,n_{CI}offset}^{(L)}$ of $m_{s,n_{CI}}$ of PDCCH of more SS regions within one SS bundle, or configures the minimum values $i*M_{s,n_{CI}offset}^{(L)}$ of $m_{s,n_{CI}}$ of PDCCH of $i_{th}$ SS region in one SS bundle, where i=0, 1, . . . Rmax−1. For example, one SS bundle includes two SS regions, and one PDCCH repetition sample is included respectively within each SS region. In the first SS region, the base station does not configures the minimum values of $m_{s,n_{CI}}$, and the value of $m_{s,n_{CI}}$ starts from 0. In the second SS region, the base station configures the minimum values $M_{s,n_{CI}offset}^{(L)}$ of $m_{s,n_{CI}}$, and the value of $m_{s,n_{CI}}$ starts from $M_{s,n_{CI}offset}^{(L)}$. The PDCCH candidate position indexes of two repetition samples of a PDCCH are $m_{s,n_{CI}}$ and $m_{s,n_{CI}}+M_{s,n_{CI}offset}^{(L)}$ respectively. The frequency domain diversity gain can also be obtained by placing multiple repetition samples of one PDCCH at different PDCCH candidate positions. If the base station does not configures the minimum values of $m_{s,n_{CI}}$ of any SS region in one SS bundle, the PDCCH candidate position indexes of two repetition samples of one PDCCH are all $m_{s,n_{CI}}$. The base station configures $Y_{offset}$ to determine the starting point of SS.

For example, in Formula (1), $Y_{p,n_{s,f}}^{\mu}$ is replaced with $Y_{p,n_{s,f}}^{\mu}+Y_{offset}$.

If the base station configures PDCCH repetition transmission, the starting point of the PDCCH candidate position in each SS region where the repetition samples of one PDCCH are located respectively meets the predefined relationship. Alternatively, the base station configures $Y_{offset}$, values of more SS regions within one SS bundle. For example, one SS bundle includes two SS regions, and one PDCCH repetition sample is included respectively within each SS region. In the first SS region, the base station does not configures $Y_{offset}$, and in the second SS region, the base station configures $Y_{offset}$. Then, the starting points of PDCCH candidate positions of the first SS region and the second SS region are $Y_{p,n_{s,f}}^{\mu}$ and $Y_{p,n_{s,f}}^{\mu}+Y_{offset}$ respectively.

According to the above examples, such as example 1 and example 2, the number of PDCCHs and/or non-overlapping CCEs to be monitored in the reference time duration is determined, but how to allocate these PDCCHs and/or non-overlapping CCEs among a plurality of SSs in the reference time duration still needs further rules. In addition, in some cases, the number of PDCCHs/non-overlapping CCEs to be monitored for a plurality of SSs per unit time is still larger than the maximum number of PDCCHs/non-overlapping CCEs determined according to the above method, and certain rules are needed to determine which PDCCH candidates to abandon receiving. The rule is that SSs satisfying high priority preferentially have enough PDCCH candidates and/or non-overlapping CCEs. Alternatively, SS with the same priority reduces the number of PDCCHs and/or non-overlapping CCEs to be monitored in equal proportion.

The priority is determined according to at least one of the following methods:

1) a common search space CSS has a higher priority than a user-specific search space USS
2) Type-0 PDCCH CSS has the highest priority
3) Type-0/Type GA PDCCH CSS has the highest priority
4) Type-0, Type GA, Type-1 PDCCH CSS, and Type-2 PDCCH CSS have higher priority than Type-3 CSS.
5) The CSS with a low CSS index has a higher priority than the CSS with a high CSS index in one cell
6) Each CSS has the same priority in one cell
7) Each Type 3 CSS has the same priority in one cell
8) The SS of a Pcell has higher priority than the SS of a Scell
9) The USS of the Pcell has a higher priority than the USS of the Scell 10) The USS with a low USS index has a higher priority than the USS with a high USS index in one cell
11) Each USS has the same priority in one cell
12) A search space configured with a specific downlink control information DCI format has a higher priority than search spaces configured with other DCI formats The above-mentioned priority determination method/rule has an index number, and the index number is only used for convenient reference and has no restrictive effect. In other words, there is no order restriction among the rules for determining priority.

For example, according to the method in the above embodiment, it is determined that the number of PDCCH candidates to be monitored in one reference time duration is 20. It is assumed that the SS to be monitored by UE includes Type-0 CSS configured with the number of PDCCH candidate as 6, Type-3 CSS configured with the number of PDCCH candidate as 6, USS1 configured with the number of PDCCH candidate as 10, and USS2 configured with the number of PDCCH candidate as 10. In the case of using priority rules 1), 4) and 11), according to priority rules 1 and 4, all PDCCH candidates of Type-0 CSS are prioritized, then the configured PDCCH candidates of Type-3 CSS are ensured, and then four PDCCH candidates are allocated in USS1 and USS2 respectively according to priority rule 11.

According to an embodiment, if the adjusted number of PDCCH candidates for one SS is more than the number of PDCCH candidates configured when the base station configures the SS, the number of PDCCH candidates for each AL is determined according to a predefined rule. The predefined rule is: prioritizing the large number of PDCCH candidates for AL, or reducing in equal proportion among each AL. For example, after SS adjustment, USS1 and US2 are reduced from 10 PDCCH candidates to 4 PDCCH candidates respectively. With USS1 as an example, it is assumed that USS1 has AL=16, and configured with the number of PDCCH candidates as 2; has AL=8, and configured with the number of PDCCH candidates as 2; and has AL=4, and configured with the number of PDCCH candidates as 4. The method to determine the 4 numbers of PDCCH candidates for each AL of USS1 is as follows: according to the rule of prioritizing the number of PDCCH candidates for larger AL, the number of PDCCH candidates for USS1 is 2 for AL=16, the number of PDCCH candidates for USS1 is 2 for AL=8, and UE does not monitor PDCCH candidates for AL=4.

Based on the above-described method for the base station to send PDCCH indications to determine the information of the number of PDCCHs/non-overlapping CCEs to be monitored by the UE, the UE receives PDCCHs in accordance with the number of PDCCHs/non-overlapping CCEs to be monitored determined by the PDCCH after receiving X symbols of the last symbol of the PDCCH. In order to reduce the problem of inconsistent understanding between the base station and the UE side due to the missed detection of the PDCCH by the UE, a timer is defined. The UE starts the timer after receiving the PDCCH indicating the information used to determine the number of PDCCHs/non-overlapping CCEs to be monitored by the UE. If the new PDCCH for determining the number of PDCCHs/non-overlapping CCEs to be monitored by the UE has not been received when the timer expires, the UE determines the number of PDCCHs/non-overlapping CCEs to be monitored in a predefined manner. For example, determining the number of PDCCHs/non-overlapping CCEs to be monitored in a predefined manner is to determine the number of PDCCHs/non-overlapping CCEs to be monitored in accordance with a scaling factor of 1. Alternatively, timers are respectively configured for the transition between the states of the number of PDCCHs/non-overlapping CCEs to be monitored by the different UEs. For example, according to Example 3, the base station configures two different scaling factors $\{X, Y\}$, and the UE starts Timer 1 after receiving the PDCCH indicating the scaling factor X. If the new PDCCH for determining the number of PDCCHs/non-overlapping CCEs to be monitored by the UE has not been received when Timer1 expires, the UE determines the number of PDCCHs/CCEs to be monitored in accordance with the scaling factor Y. The UE starts Timer 2 after receiving the PDCCH indicating the scaling factor Y. If the new PDCCH for determining the number of PDCCHs/non-overlapping CCEs to be monitored by the UE has not been received when Timer 2 expires, the UE determines the number of PDCCHs/non-overlapping CCEs to be monitored in accordance with the scaling factor X.

Due to the limited bandwidth that can be supported by the UE terminal, the PDCCH performance is degraded. For example, the limited downlink bandwidth cannot ensure that CORESET has enough frequency domain resources to support the required PDCCH Aggregation level (AL). When the frequency domain resources are limited, it is a reasonable direction to expand in the time domain dimension. For another example, due to the limited bandwidth that can be supported by the UE terminal, the UE cannot obtain frequency domain diversity gain or frequency domain selectivity gain on sufficiently wide frequency domain resources.

According to an aspect of the present invention, based on the CORESET/SS configured by the base station for the UE on a plurality of sub-bands, or dividing the frequency domain resource of one CORESET into a plurality of sub-bands, the UE can receive PDCCH on different sub-bands to obtain frequency domain diversity gain or frequency domain selectivity gain. For example, one carrier bandwidth or BWP bandwidth is divided into $N_{num\_f}$ sub-bands, and CORESET/SS is configured on one or more sub-bands. According to an implementation, the base station configures one SS and configures a sub-band set of this SS. The base station may also configure frequency domain starting point offset information $P_{offset}$ to determine the frequency domain starting point position of CORESET/SS within each sub-band in the sub-band set of this SS. For example, the sub-band set indicates the bit field, and indicates the sub-band set where the SS is located based on the bitmap, '10011' indicates that this SS is included on sub-bands 1, 4, and 5, and the frequency domain starting point offset indicates the bit field, indicates $P_{offset}$, is applicable to each sub-band including this SS, or indicates $P_{offset\_i}$ for each sub-band including the SS. Alternatively, the base station configures a group of SSs, and configures one or more sub-bands where this group of SSs is located, that is, the sub-bands where each SS in this group is located are the same. For example, the base station configures two groups of SSs, wherein Group 1 includes SS1 and SS3, and Group 2 includes SS2. The base station configures the sub-bands set where this SS set is located as '10011' for Group 1, that is, each sub-band of sub-bands 1, 4 and 5 includes SS1 and SS3, and the base station configures the sub-bands set where this SS set is located as '11000' for Group 2, that is, each sub-band of sub-bands 1 and 2 includes SS2. For another example, the base station configures one CORESET, and the frequency domain resources are 20 PRBs. The first 10 PRBs are one sub-band, and the last 10 PRBs are one sub-band, which are respectively used for two repetition transmissions of a PDCCH.

According to an implementation, the base station configures one CCE-REG-MappingType of CORESET as an interleaving-based mapping mode, and interleaving is performed in one sub-band, but interleaving cannot be performed across sub-bands, so that the UE can independently demodulate PDCCH samples in each sub-band. According to another implementation, interleaving can be performed across sub-bands, and the UE needs to jointly demodulate PDCCH samples in each sub-band, but greater frequency domain diversity gain can be obtained. According to another implementation, interleaving is performed in the SS region or SS sub-region or sub-band associated with the same TCI, but interleaving cannot be performed in the SS region or SS sub-region or sub-band associated with different TCI. Thereinto, SS sub-region is a smaller time area divided by one SS region or the PDCCH monitoring occasion in time dimension.

If the base station configures one CORESET with precoding granularity of all continuous RBS (for example, precoderGranularity=allContiguousRBs), the UE assumes that the precoding of continuous frequency domain resources in one sub-band in the CORESET is the same. Or, the UE assumes that the precoding of the continuous frequency domain resources within the sub-band associated with the same TCI in the CORESET is the same. According to another implementation, the UE assumes that the precoding of continuous frequency domain resources in the SS region or SS sub-region associated with the same TCI in the CORESET is the same.

Alternatively, the UE monitors CORESET/SS on a plurality of sub-bands at one moment. Alternatively, the UE only monitors CORESET/SS on one sub-band at one moment. The UE determines the sub-band of CORESET/SS where the PDCCH required to be monitored currently is located according to the indications of the base station and the predefined rules.

According to an embodiment, the UE determines the sub-band of CORESET/SS where the PDCCH required to be monitored currently is located based on the relationship between the sub-band set of CORESET/SS configured by the base station and time resources. For example, in accordance with the order of the index of the sub-bands indicated in the sub-band set from small to large, the sub-bands where CORESET/SS is located in the time resource i are determined in accordance with the given time granularity in sequence. For example, the sub-band set where one CORESET/SS is located is configure as '10011', and the time resource (PDCCH MO) of the SS takes 10 slots as a period, for the first 3 slots in each period, symbols 1-3 and symbols 8-10 in each slot, that is, there is a total of 6 PDCCH MOs in one period. If the given time granularity is PDCCH MO, the CORESET/SS corresponding to the $1^{st}$ and $4^{th}$ MOs in one period is on sub-band 1, the CORESET/SS corresponding to the $2^{nd}$ and $5^{th}$ MOs is on sub-band 2, and the CORESET/SS corresponding to the $3^{rd}$ and $6^{th}$ MOs are on sub-band 3. Or, if the given time granularity is one slot, the CORESET/SS corresponding to the Is and $2^{nd}$ MO is on sub-band 1, the CORESET/SS corresponding to the $3^{rd}$ and $4^{th}$ MO is on sub-band 2, and the CORESET/SS corresponding to the $5^{th}$ and $6^{th}$ MO is on sub-band 3. For another example, a two-dimensional pattern in time frequency domain is configured to determine the relationship between the sub-band index and the time resource.

Alternatively, the UE may also determine the sub-band of CORESET/SS where the PDCCH required to be monitored currently is located based on the sub-band of CORESET/SS of one or more time resources rewritten by the base station through signaling. For example, according to the previous example, the CORESET/SS corresponding to the $1^{st}$ and $2^{nd}$ MOs is on sub-band 1, the CORESET/SS corresponding to the $3^{rd}$ and $4^{th}$ MOs is on sub-band 2, and the CORESET/SS corresponding to the $5^{th}$ and $6^{th}$ MOs is on sub-band 3. The base station sends a PDCCH in the $3^{rd}$ MO indicating that the sub-band of CORESET/SS is sub-band 1, that is, CORESET/SS corresponding to the $4^{th}$ MO is rewritten as sub-band 1. The rewriting information is valid only once, so the CORESET/SS corresponding to the $5^{th}$ and $6^{th}$ MO is still on sub-band 3. Or, the base station sends a PDCCH in the $3^{rd}$ MO indicating that the sub-band of CORESET/SS is sub-band 1, and the sub-band of CORESET/SS of the $1^{st}$ MO after the start time delay of X from the end position of the PDCCH is sub-band 1. For example, if the $1^{st}$ MO after the end position start time delay X of the PDCCH is the $5^{th}$ MO, then the CORESET/SS of the $5^{th}$ MO is on sub-band 1. The rewriting information is valid only once, so the CORESET/SS corresponding to the $6^{th}$ MO is still on sub-band 3.

According to another embodiment, the UE determines the sub-band of CORESET/SS where the PDCCH required to be monitored currently is located based on the sub-band of CORESET/SS indicated by the base station through signaling. For example, the base station indicates the sub-band of CORESET/SS through physical layer signaling or MAC layer signaling. Considering the delay of UE in processing the signaling, the indicated sub-band information is suitable for CORESET/SS after the start time delay x of the end position of the physical channel carrying the signaling. The end position of a physical channel is the end position of the last symbol of the physical channel or the end position of the last symbol of the slot or subframe where the physical channel is located. Alternatively, the physical layer signaling is carried by a specific DCI, such as DCI format for indicating sub-band switching, or by scheduling a specific bit field in DCI of PDSCH and/or PUSCH. Alternatively, the base station configures a default sub-band and a timer, and when the timer expires, the UE returns to the default sub-band to receive the PDCCH. Alternatively, the UE receives one PDCCH pointing to sub-band i and starts to startup the timer. If the timer expires and the UE does not receive a new PDCCH on this sub-band i, the UE returns to the default sub-band to receive PDCCH.

According to another embodiment, the UE determines the sub-band of CORESET/SS where the PDCCH required to be monitored currently is located according to the sub-band where the PDSCH is located, or determines the sub-band where the PDCCH required to be monitored currently is located according to the sub-band where the PDSCH is located and the sub-band set of CORESET/SS. For example, the base station configures the sub-band set of SS1 as '10011' and the sub-band set of SS2 as '11000'. If the UE receives the PDSCH of the PDCCH scheduling sub-band 4 on the SS2 of sub-band 1, the UE receives PDSCH on sub-band 4 and monitors SS1 to receive PDCCH on sub-band 4. Because the sub-band set of SS2 does not include sub-band 4, the UE does not monitor SS2 on sub-band 4. For another example, the base station does not configure a sub-band set, and the base station only configures a default sub-band. In case the base station receives the PDSCH of the PDCCH scheduling sub-band 4 on the default sub-band, the UE receives the PDSCH on sub-band 4 and receives the PDCCH on sub-band 4. According to another embodiment, the UE determines the sub-band of CORESET/SS in the time window W according to the sub-band where PDSCH is located, and determines the CORESET/SS sub-band where the PDCCH outside the time window W is located according to the relationship between the sub-band set of configured CORESET/SS and time resources. Preferably, the starting point of the time window W is the end position of the last PDSCH, and the length of W can be configured. For example, the base station configures the sub-band set of SS1 as '10011' and the sub-band set of SS2 as '11000', the UE receives the PDSCH1 of the PDCCH scheduling sub-band 4 on the SS2 of sub-band 1, and within W symbols of PDSCH1 end symbol, the UE stays on sub-band 4 to continue monitoring the PDCCH. If the UE does not receive the PDCCH scheduling the PDSCH, the UE determines the sub-band of the CORESET/SS where the PDCCH required to be monitored currently is located according to the relationship between the configured sub-band sets of CORESET/SS of SS1 and SS2 and time resources. If the UE receives the PDCCH scheduling PDSCH2 on sub-band 1, the UE receives the PDCCH on the sub-band of the PDSCH2, and starts the time window W starting from the end position of the PDSCH2. Preferably, the sub-band of the first type of SS is determined according to the sub-band where the PDSCH is located, and the sub-band of the second type of SS is determined only according to the configured sub-band set of CORESET/SS. For example, the first type of SS is the user-specific search space USS, and the second type of SS is the common search space CSS.

Figure 7:
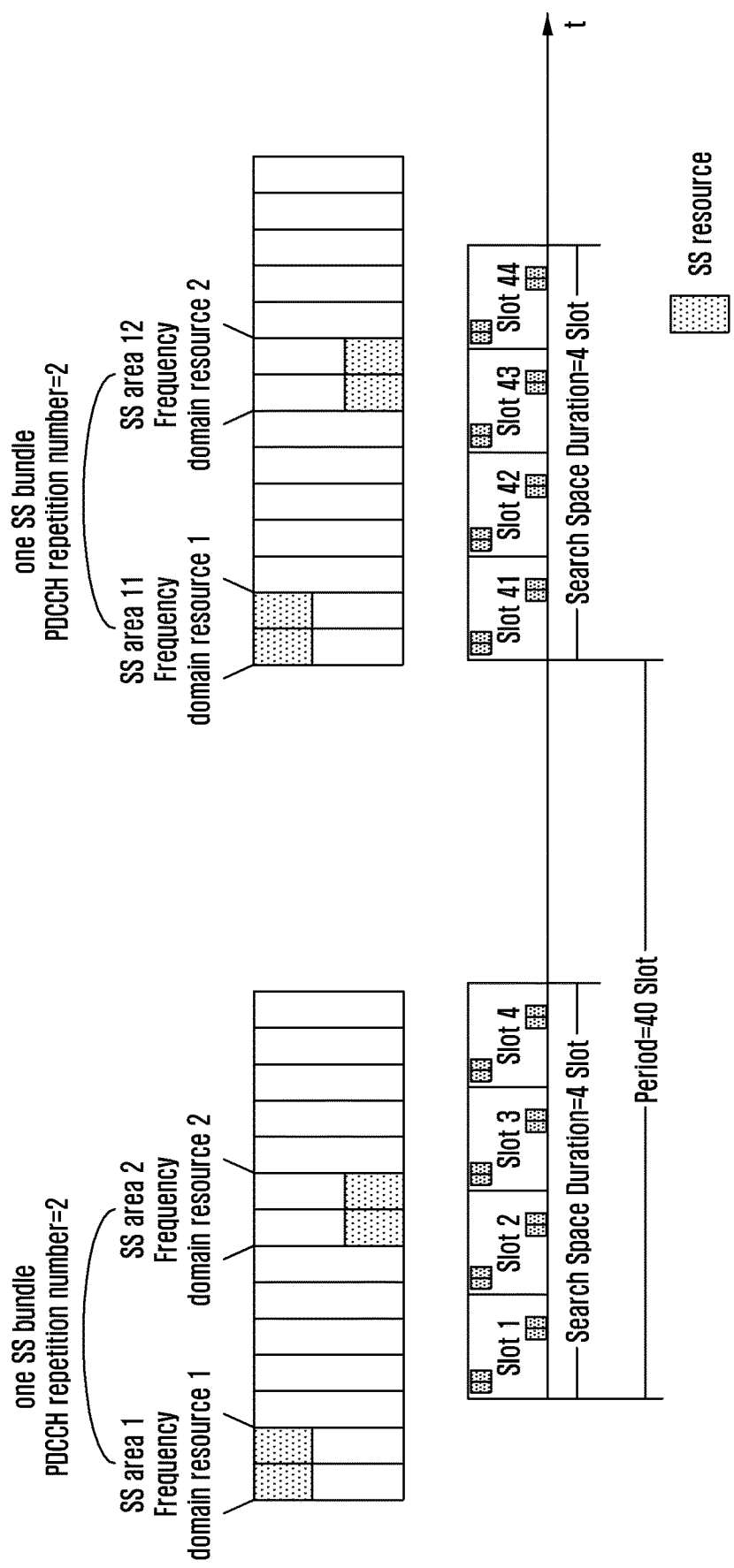
FIG. 7 exemplarily illustrates the time-frequency domain resources of SS bundle.

According to an aspect of the present application, the UE supports PDCCH repetition transmission (repeated transmission of PDCCH). The SS set(s) used for multiple repetition transmissions of one PDCCH is called one SS bundle, and the SS bundle includes a plurality of PDCCH MOs (or SS regions), and the frequency domain resources of each SS region in the SS bundle meet a predefined relationship. FIG. 7 exemplarily illustrates the time-frequency domain resources of SS bundle.

In order to obtain the frequency domain diversity gain, the frequency domain resources of at least two SS regions in the SS bundle are different. According to an implementation, each SS region constituting one SS bundle is located in the same BWP, and each SS region may be located in the same or different sub-bands in the same BWP. For example, BWP1 has a bandwidth of 40 MHz, including 2 sub-bands, each of which has a bandwidth of 20 MHz. Two SS regions of one SS bundle are located in the $1^{st}$ and $2^{nd}$ sub-bands respectively. According to another implementation, each SS region constituting one SS bundle is located in different BWPs. For example, BWP1 and BWP2 have a bandwidth of 20 MHz respectively, and two SS regions of one SS bundle are located in BWP1 and BWP2 respectively.

According to an implementation, the base station configures the frequency domain resources and BWP/sub-band information of CORESET/SS, and determines the frequency domain resource position of each SS region of one SS bundle according to the frequency domain resources and BWP/sub-band information. For example, a frequencyDomainResources of one CORESET is configured, which indicates PRB information occupied by CORESET, and the BWP or sub-band set of CORESET/SS is configured. According to the relationship between the reference time point and the SS region, the BWP or sub-band where CORESET of this SS region is located is determined. According to an example, the reference time point is a system frame $SF_r$, such as a system frame 0. A BWP set of one CORESET/SS is BWP1 and BWP2. At the beginning of system frame SFr, the BWP of CORESET for the $1^{st}$ SS region is BWP1, the BWP of CORESET for the $2^{nd}$ SS region is BWP2, the BWP of CORESET for the $3^{rd}$ SS region is BWP1, and so on. The first SS region in one SS bundle is not necessarily the first SS after the reference time point. For example, the first SS bundle consists of the second and third SS described above. According to another example, if the reference time point is the first SS region in one SS bundle, the BWP of CORESET for the $1^{st}$, $3^{rd}$, . . . SS region in one SS bundle is BWP1, and the BWP of CORESET for the $2^{nd}$, $4^{th}$, . . . SS region in one SS bundle is BWP2. Within each BWP, the PRB where CORESET/SS region is located is determined according to frequencyDomainResources. Alternatively, the starting point offset information $P_{offset}$ may also be configured to determine the PRB where the CORESET/SS region in the BWP/sub-band is located. For example, the PRB where the CORESET/SS region is located in BWP1 is determined according to frequencyDomainResources, the number of PRBs where the CORESET/SS region is located in BWP2 is determined according to frequencyDomainResources, and the frequency domain starting point PRB for the CORESET/SS region in BWP2 is determined according to $P_{offset}$.

According to another implementation, the base station configures the frequency domain resources and frequency domain offset information of CORESET/SS, and determines the frequency domain resource position of each SS region of one SS bundle according to the frequency domain resources and frequency domain offset information. Alternatively, the frequency domain offset information is frequency hopping offset $N_{f\_hop}$, which is used to determine the frequency domain resource starting point of CORESET/SS after frequency hopping. Alternatively, the frequency domain resource information of CORESET/SS configured by the base station is determined according to the frequencyDomainResources of CORESET, and the frequencyDomainResources indicates the PRB information occupied by CORESET. According to the relationship between the reference time point and the SS region, it is determined that the CORESET frequency domain resources for the SS region are determined according to the frequencyDomainResources or the frequencyDomainResources and the frequency hopping offset $N_{f\_hop}$. According to an example, the reference time point is system frame $S_{Fr}$, such as system frame 0, the frequency domain resource of CORESET for the $1^{st}$ SS at the beginning of system frame $SF_r$ is determined according to frequencyDomainResources, the frequency domain resource of CORESET of the $2^{nd}$ SS is determined according to frequencyDomainResources and $N_{f\_hop}$, the frequencyDomainResources of CORESET of the $3^{rd}$ SS are determined according to frequencyDomainResources, the frequency domain resources of CORESET of the $4^{th}$ SS are determined according to frequencydomainresources and $N_{f\_hop}$, and so on. According to another example, if the reference time point is the first SS region in one SS bundle, then the CORESET frequency domain resources for the $1^{st}$, $3^{rd}$, . . . SS region in one SS bundle are determined according to frequencyDomainResources, and the CORESET frequency domain resources for the $2^{nd}$, $4^{th}$, . . . SS region in one SS bundle are determined according to frequencyDomainResources and frequency hopping offset $N_{f\_hop}$. According to the frequency hopping offset $N_{f\_hop}$, the method to determine the starting point of frequency domain resources for one SS region is to determine the frequency domain resources for a SS region according to the reference frequency domain starting point, the frequency hopping offset $N_f\_hop$ and the reference frequency domain bandwidth. The frequency domain resource starting point for one SS region=$(N_{f0}+N_{f\_hop})$ mod $N_{ref\_b}$, wherein $N_{f0}$ is the reference frequency domain starting point and $N_{ref\_b}$ is the reference frequency domain bandwidth. For example, $N_{f0}$ is the starting point PRB of the carrier, or the starting point $N_f$ of CORESET, and $N_{ref\_b}$ is the carrier bandwidth. Assuming that the carrier bandwidth is 106 PRBs, the starting point of CORESET is located at the $80^{th}$ PRB within the carrier bandwidth, and $N_{f\_hop}$=30, then the starting point of frequency domain resources for this SS region is the $4^{th}$ PRB within the carrier bandwidth. In another example, $N_{f0}$ is the frequency domain starting point PRB of the kth frequency hopping sub-band within the carrier bandwidth, and $N_{ref\_b}$ is the bandwidth of the kth frequency hopping sub-band or the carrier bandwidth. In another example, $N_{f0}$ is the frequency domain starting point PRB of the kth frequency hopping sub-band within the active BWP, and $N_{ref\_b}$ is the bandwidth of the active BWP.

Alternatively, each SS region constituting one SS bundle can belong to different CORESET (also belong to different SS). According to predefined rules or base station configuration, each CORESET that constitutes one SS bundle is determined. In order to obtain frequency domain diversity gain, the base station can configure different frequency domain resources for different CORESET. For example, the base station configures CORESET 1 and CORESET 2 for the UE, which are located in PRB X1~X2 and PRB Y1~Y2 respectively, and the corresponding SSs are located in the $1^{st}$~$3^{rd}$ and $5^{th}$~$7^{th}$ symbols of one slot respectively. One SS bundle includes 4 SS regions, namely, the SS region of CORESET1 of $1^{st}$~$3^{rd}$ symbols of the $1^{st}$ slot, the SS region of CORESET2 of the $5^{th}$~$7^{th}$ symbols of the $2^{nd}$ slot, the SS region of CORESET2 of the $1^{st}$~$3^{rd}$ symbols of the $2^{nd}$ slot and the SS region of CORESET2 of the $5^{th}$~$7^{th}$ symbols of the $2^{nd}$ slot.

If the frequency domain resources occupied by adjacent SSs are different and exceed the bandwidth supported by the UE, for example, the operation bandwidth of UE is 20 MHz, and the first SS region and the second SS region are within two different 20 MHz respectively, then the UE needs a certain amount of time Lgap to adjust the operation frequency point (also called return). When the base station configures the SS regions, it should be ensured that the interval between such two SS regions is greater than or equal to Lgap. For example, Lgap is a symbol, SS region 1 is symbols 1-3 of one slot, and the starting point of SS region 2 cannot be earlier than symbol 5. If the interval of the SS region configured by the base station is less than Lgap, it is necessary to abandon receiving the SS region with low priority before transforming the frequency domain resources according to the priority rule, so as to ensure enough return time.

The priority rule is at least one of the following:
1. The common search space CSS has a higher priority than that of user-specific search space USS.
2. If there are a plurality of CSSs, the CSS with a smaller index value has a higher priority.
3. If there are a plurality of USSs, the USS with a smaller index value has a higher priority.
4. The specific type of CSS has a higher priority than the type 3 PDCCH CSS, wherein, the specific type of CSS includes at least one of Type-0 PDCCH CSS, Type-GA PDCCH CSS, Type-1 PDCCH CSS and Type-2 PDCCH CSS.
5. The search space configured with a specific DCI format has a higher priority than the search spaces configured with other DCI formats.

For example, it is used to indicate the SS of the DCI format of the sub-band/BWP of CORESET/SS.

If the frequency domain resources of different SSs are located in different BWPs, the UE only needs to receive the PDCCH within the corresponding BWP, without BWP switching. The UE needs a certain amount of time Lgap to adjust the operation frequency, but the time length of Lgap is often shorter than the time length of the BWP handover.

Since the UE can only receive signals on one sub-band/BWP at one moment, if the UE is configured with a plurality of CORESET/SSs, the base station needs to ensure that the sub-bands/BWPs where a plurality of CORESET/SSs overlap in time dimension are the same. Considering that this configuration may be difficult to implement in some practical scenarios, according to another implementation, the base station can configure that the sub-bands/BWPs where a plurality of CORESET/SSs overlap in time dimension are different, and the UE needs to determine which one or more CORESET/SSs are selected for reception according to predefined rules, and abandon receiving other CORESET/SS. The predefined rule is to preferentially receive the SS with high priority. Similarly, if the interval between two SS regions located on different sub-bands/BWPs configured by the base station is less than Lgap, the UE needs to determine which one or more CORESET/SSs are selected for reception according to the predefined priority rules described below, and abandon receiving other CORESET/SSs to ensure enough retune time.

If the UE determines that one or more SSs are located on sub-band i/BWPi and other SSs are located on sub-band j/BWPj according to priority, the UE will only receive the corresponding SSs on sub-band i/BWPi and abandon receiving SSs of sub-band j/BWPj. For example, the CSS1, USS1 and USS2 of the UE overlap in time dimension, and the sub-bands of these 3 SSs are sub-band 1, sub-band 1 and sub-band 2 respectively. According to CSS1 with the highest priority, the UE determines to monitor CSS1 and USS1 on sub-band 1 within this time period, and the UE abandons receiving USS2.

According to another implementation, the base station can configure that the subbands/BWPs where a plurality of CORESET/SSs overlapping in time dimensions are located are different, and the UE needs to determine which one or more CORESET/SSs to select for reception according to predefined rules, and receive other specific type of CORESET/SS on the sub-band i/BWPi of the one or more CORESET/SSs. Alternatively, the specific type of CORESET/SS is USS. For example, the CSS1, USS1 and USS2 of the UE overlap in time dimension, and the sub-bands of these 3 SSs are sub-band 1, sub-band 1 and sub-band 2 respectively. According to CSS1 with the highest priority, the UE determines to monitor CSS1 and USS1 on sub-band 1 within this time period. Although USS2 configured by the base station is located on sub-band 2, the base station 2 temporarily moves USS2 to sub-band 1, so that the UE can monitor CSS1, USS1 and USS2 on sub-band 1 at the same time.

According to an implementation, the UE receives CORESET/SS on sub-band i, and the UE can keep receiving signals on sub-band i until X symbols before the signal beginning of the next sub-band j start to switch to sub-band j. For example, in one slot, symbols 1-3 are PDCCH MO1, symbols 6-8 are PDCCH M02, and symbols 11~13 are PDCCH M03, which are located on sub-bands 1, 2 and 3 respectively. In the case of X=1, the UE can be on sub-band 1 for symbols 1-4 and switch to sub-band 2 since symbol 5, and the UE can be on sub-band 2 for symbols 6~9 and switch to sub-band 3 since symbol 10.

According to an implementation, in one SS bundle, after the UE finishes receiving the PDCCH, the UE stays on the sub-band i where the first PDCCH is located, or stays on the sub-band i where the last received PDCCH is located, or stays on the sub-band i where the PDCCH corresponding to the configured maximum number of repetitions Rmax is located. Alternatively, the UE stays on sub-band i until it needs to switch to another sub-band j.

According to an aspect of the present invention, the length of the existing CORESET symbol is increased to solve the problem of limited frequency domain resources. The symbol length of the existing CORESET is 1, 2 or 3. In order to support larger PDCCH AL or PDCCH repetition, the symbol length of CORESET can be increased, for example, up to 6 symbols. In one SS region, CCE/REG mapping is performed, that is, all CCEs of one PDCCH are mapped in one SS region. For example, the CORESET symbol length is 6 symbols, and one CCE is mapped to 6 symbols of 1 PRB. Or, the time resource of one CORESET is divided into $N_{num\_h}$ time resource sub-blocks, one CCE is mapped in only one time resource sub-block, and different CCEs can be mapped in different time resource sub-blocks. For example, the CORESET symbol length is 6 symbols and divided into 2 time resource sub-blocks, and each time resource sub-block has a length of 3 symbols. One CCE is mapped to 3 symbols of 1 PRB. If the AL of one PDCCH candidate is 32, the $1^{st}$~$16^{th}$ CCEs are mapped to the time resource sub-block 1, and the $17^{th}$~$32^{nd}$ CCEs are mapped to the time resource sub-block 2. In this way, a UE configured with one CORESET length of 3 and a UE configured with a CORESET length of 6 can both demodulate the same PDCCH.

In order to obtain a frequency domain diversity gain in one CORESET, the time resource of one CORESET is divided into $N_{num\_h}$ time resource sub-blocks, and the CORESET frequency domain resource of each time resource sub-block is determined according to the above-described method. Considering that the CORESET after frequency hopping may be located in frequency domain resources outside the operation bandwidth of the UE, the UE needs a certain amount of time Lgap to adjust the operation frequency. According to an implementation, the duration of CORESET configured by the base station does not include Lgap, but only includes the length of time resources for actually sending CORESET. The length of the Lgap time and the starting position are determined according to a predefined way. For example, CORESET duration is 6 symbols, divided into $N_{num\_h}$=2 time resource sub-blocks, and each time resource sub-block is 3 consecutive symbols. Lgap is located between 2 time resource sub-blocks. The interval between the starting point of each PDCCH monitoring occasion MO/SS region of the SS corresponding to the same CORESET configured by the base station is not less than the sum of the CORESET duration and the Lgap time length. For example, if the length of CORESET duration is 6 and Lgap is 1, then the bit interval between any two '1's in monitoringSymbolsWithinSlot is not smaller than 7, for example, monitoringSymbolsWithinSlot indicates 10000001000000. Symbols 1 to 7 of this slot are the first MO, wherein symbols 1-3 are the first time resource sub-block, the $4^{th}$ symbol is Lgap, and the $5^{th}$~$7^{th}$ are the second time resource sub-block. Symbols 8~14 of this slot are the second MO, wherein symbols 8~10 are the first time resource sub-block, the $11^{th}$ symbol is Lgap, and the $12^{th}$~$14^{th}$ are the second time resource sub-block. According to another implementation, the duration of CORESET configured by the base station includes Lgap and the time resources length for actually sending CORESET. The time length of the Lgap and the initial position are determined according to a predefined manner.

According to an aspect of the application, a method for selecting a reference frequency domain point and/or determining the frequency domain resource where the PDSCH is located when the repetition number R of the PDCCH for scheduling PDSCH is greater than 1 is also proposed.

According to an embodiment of the present application, the BWP/sub-band of the PDSCH scheduled by the PDCCH is determined with the BWP/sub-band where the PDCCH is repeatedly transmitted for the $R_i^{th}$ time as a reference frequency domain point. Preferably, the PDCCH transmitted repeatedly for the $R_i^{th}$ time is the $1^{st}$ PDCCH transmitted, or the last PDCCH transmitted, or the PDCCH with the maximum repetition number Rmax. For example, when the BWP indication is not included in the DCI, the position of the PDSCH needs to be determined according to a predefined rule. Generally, the starting point of the Is PDCCH transmission of the PDCCH repeated R times or the end position of the maximum repetition number Rmax is unambiguous, so the BWP of the scheduled PDSCH can be unambiguously determined according to the BWP where the Is PDCCH or the $Rmax^{th}$ PDCCH is located. In some cases, it may happen that the number of times R of PDCCHs actually sent by the base station does not match the number of times R' of PDCCHs received by the UE. In order to avoid the UE's misunderstanding of the value of R, the base station may explicitly or implicitly indicate the value of R. For example, the value of R may be indicated in the DCI, or different scrambling codes may be used to express different R values. Then, the BWP of the scheduled PDSCH can also be unambiguously determined according to the BWP where the last PDCCH (the $R^{th}$ PDCCH) sent actually is located. According to another embodiment of the present application, the BWP/sub-band where the PDSCH is located is determined according to the BWP/sub-band indicated by the PDCCH, or the BWP/sub-band where the PDSCH is located is determined according to the PRB position of the PDSCH indicated by the PDCCH.

According to an aspect of the present application, a method for selecting a reference frequency domain point and/or determining a frequency domain resource where the PDSCH is located in the case of scheduling the PDCCH frequency hopping of the PDSCH is also proposed. The BWP/sub-band of the PDSCH scheduled by the PDCCH is determined according to the BWP/sub-band where the PDCCH resource of the $H_i^{th}$ frequency hopping of the PDCCH is located as the reference frequency domain point. Preferably, the $H_i^{th}$ frequency hopping is the $1^{st}$ frequency hopping, or the last frequency hopping, or the frequency hopping of the maximum frequency hopping number Hmax. For example, for a CORESET with a length of 6 symbols, the first 3 symbols are the $1^{st}$ frequency hopping area on sub-band i, and the last 3 symbols are the $2^{nd}$ frequency hopping area on sub-band j. Then, according to the BWP/sub-band where the $2^{nd}$ frequency hopping area is located, it can be determined that the PDSCH is on the sub-band j.

According to another aspect of the present application, the start symbol of the PDSCH cannot be earlier than the start symbol of the last repetition of PDCCH scheduling the PDSCH. Or, the start symbol of the PDSCH cannot be earlier than the start symbol of the slot in which the last repetition of PDCCH scheduling the PDSCH. Alternatively, the start symbol of the PDSCH cannot be earlier than the start symbol of the last frequency hopping area of the PDCCH scheduling the PDSCH. Or, the start symbol of the PDSCH cannot be earlier than X symbols before the start symbol of the last frequency hopping area of the PDCCH scheduling the PDSCH. Alternatively, the last repetition or the last frequency hopping area is determined according to the maximum repetition number Rmax or the maximum frequency hopping number Hmax. Considering that multiple PDCCH repetitions may occupy different frequency domain resources, or different frequency hopping areas of a PDCCH transmission may occupy different frequency domain resources, such as occupying different sub-bands, by restricting the starting point of PDSCH to be no earlier than the starting point of the last frequency domain area where the UE receives the PDCCH, it can be avoided that the UE cannot monitor the PDSCH in a different sub-band from the PDCCH because of receiving the PDCCH. The UE stays on the sub-band of receiving PDCCH to receive downlink signals before demodulating PDCCH. After the UE demodulates the PDCCH, if the PDCCH indicates the same sub-band, the UE can continue to receive on this sub-band and find the PDSCH from the received signal. If the PDCCH indicates another sub-band to receive the PDSCH, the base station ensures that the UE has enough time to switch from the sub-band where the PDCCH is located to the sub-band where the PDSCH is located through scheduling, for example, it indicates a sufficiently large K0 (the time difference between the PDCCH and the PDSCH).

Alternatively, the UE does not need to monitor the SS that overlaps with the scheduling-based PDSCH in the time dimension but is located on a different BWP/sub-band from the PDSCH.

Alternatively, the UE does not need to monitor the SS that overlaps with the scheduling-based downlink reference signal in the time dimension but is located on a different BWP/sub-band from the downlink reference signal.

Alternatively, for the SS that overlaps with a PDSCH or a downlink reference signal (such as a DL SPS PDSCH) based on a higher layer configuration in the time dimension but is located in a different BWP/sub-band with the downlink reference signal, and the SS is the first type of SS, the UE needs to monitor the SS and abandon receiving the PDSCH or downlink reference signal. The first type of SS includes at least one of the following SSs: Type-0 PDCCH CSS, Type-0A PDCCH CSS, Type-1 PDCCH CSS, Type-2 PDCCH CSS, Type-3 PDCCH CSS, specific types of USS, SS including a specific DCI format.

Alternatively, for the SS that overlaps with the SS/PBCH in time dimension but is located in a different BWP/sub-band from the SS/PBCH, and the SS is a Type-0 PDCCH SS. If the UE monitors the SS, the UE may abandon receiving the SS/PBCH.

According to another aspect of the present application, the start symbol of the aperiodic CSI-RS cannot be earlier than the start symbol of the last repetition of PDCCH that triggers the CSI-RS. Or, the start symbol of the aperiodic CSI-RS cannot be earlier than the start symbol of the first repetition of the PDCCH that triggers the CSI-RS. Or, the start symbol of the aperiodic CSI-RS cannot be earlier than the end symbol of the last repetition transmission of the PDCCH that triggered the CSI-RS. Or, the start symbol of the aperiodic CSI-RS cannot be earlier than the end symbol of the first repetition transmission of the PDCCH that triggers the CSI-RS. The symbol and slot where the aperiodic CSI-RS is located are determined according to the slot where the start symbol of the last repetition of the PDCCH that triggered the CSI-RS is located, or the slot of the start symbol of the first repetition of the PDCCH, or the slot where the end symbol of the last repetition of the PDCCH is located, or the slot where the end symbol of the first repetition of the PDCCH is located.

Figure 8:
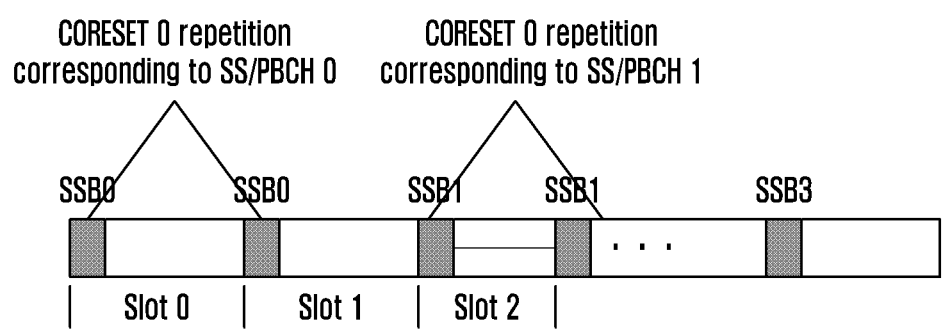
FIG. 8 illustrates an example of repetition transmission samples of a PDCCH associated with SS/PBCH index i respectively located in Type0-PDCCH monitoring occasions associated with SS/PBCH index i in consecutive slots $n_o$ and $n_o+1$.

According to an aspect of the present application, the base station indicates in system information, such as MIB, that the repetition transmission samples of a PDCCH associated with SS/PBCH index i are located in the Type0-PDCCH monitoring occasions associated with SS/PBCH index i in consecutive slots $n_o$ and slot $n_o+1$ respectively. Wherein, the slot $n_o$ is determined according to the monitoring occasion configuration information of Type0-PDCCH in the system information. FIG. 8 illustrates an example in which the repetition transmission samples of a PDCCH associated with SS/PBCH index i are located in the Type0-PDCCH monitoring occasions associated with SS/PBCH index i in consecutive slots $n_o$ and slot $n_o+1$ respectively. In FIG. 8, taking SS/PBCH index 0 as an example, two repetition transmission samples of a PDCCH associated with SS/PBCH index 0 are located in the Type0-PDCCH monitoring occasions associated with SS/PBCH index 0 in consecutive slot 0 and slot 1 respectively.

Figure 9:
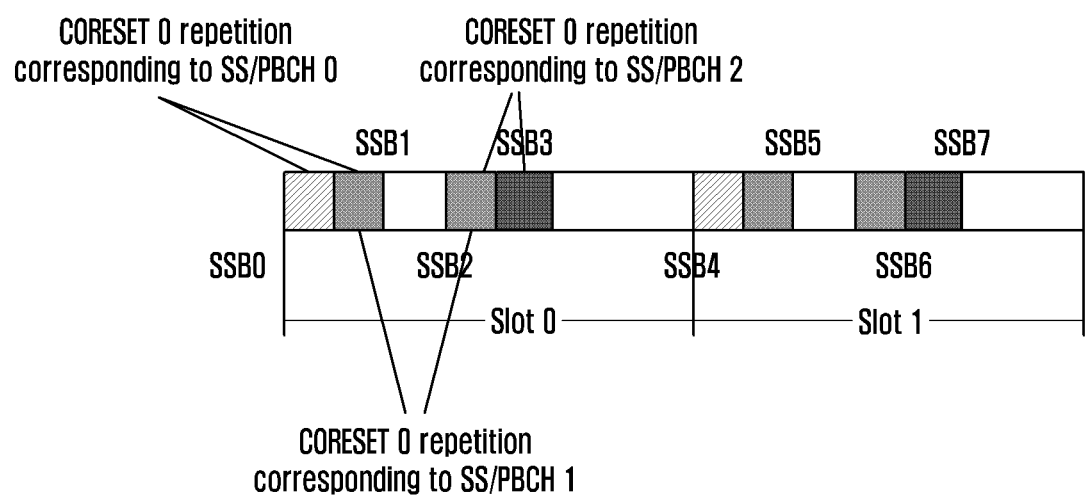
FIG. 9 illustrates an example of repetition transmission samples of a PDCCH associated with SS/PBCH index i respectively located in Type0-PDCCH monitoring occasion associated with SS/PBCH index i and Type0-PDCCH monitoring occasion associated with SS/PBCH index i+1 which immediately adjacent to SS/PBCH index i in slot $n_o$.

Or, the base station indicates in the system information that the repetition transmission samples of a PDCCH associated with the SS/PBCH index i are located in the Type0-PDCCH monitoring occasion of the SS/PBCH index i and the Type0-PDCCH monitoring occasion of the immediately adjacent SS/PBCH index i+1 in the slot $n_o$ respectively. FIG. 9 illustrates an example in which the repetition transmission samples of a PDCCH associated with SS/PBCH index i are located in the Type0-PDCCH monitoring occasion of SS/PBCH index i and the Type0-PDCCH monitoring occasion of the immediately adjacent SS/PBCH index i+1 in the slot $n_o$ respectively. In FIG. 9, two repetition transmission samples associated with a PDCCH of SS/PBCH index 0 are located in the Type0-PDCCH monitoring occasion of SS/PBCH index 0 and the Type0-PDCCH monitoring occasion of immediately adjacent SS/PBCH index 1 in slot 0 respectively; two repetition transmission samples associated with a PDCCH of SS/PBCH index 1 are located in the Type0-PDCCH monitoring occasion of SS/PBCH index 1 and the Type0-PDCCH monitoring occasion of the immediately adjacent SS/PBCH index 2 in slot 0 respectively; and two repetition transmission samples associated with a PDCCH of SS/PBCH index 2 are located in the Type0-PDCCH monitoring occasion of SS/PBCH index 2 and the Type0-PDCCH monitoring occasion of immediately adjacent SS/PBCH index 3 in slot 0 respectively.

Or, the base station indicates in the system information that the repetition transmission samples of a PDCCH associated with SS/PBCH index i are located in the Type0-PDCCH monitoring occasion of SS/PBCH index i in slot $n_o$ and the Type0-PDCCH monitoring occasion of SS/PBCH index i in slot $n_o+Np$, wherein Np is the period of SS/PBCH.

According to another aspect of the present application, the PDCCH repetition transmission is performed for paging according to a predefined rule. The base station configures the repetition number Y, for example, the repetition number is configured through system information.

According to a method, if the base station configures the repetition number Y, but does not configure a PDCCH monitoring occasion X in a SS/PBCH in a paging occasion (PO) (for example, X is configured through the parameter nrofPDCCHMonitoringOccasionPerSSB-InPO), the UE assumes that the Y repetitions of a PDCCH corresponding to the $K^{th}$ SS/PBCH are in the $[y*S+K]^{th}$ PDCCH monitoring occasion in a PO, where y=0, 1, . . . , Y−1, S is the number of SS/PBCH, K=1, 2, . . . , S. For example, if S=4 and Y=2, the 2 PDCCH retransmissions of a PDCCH corresponding to the $1^{st}$ (K=1) SS/PBCH are located in the 1s and $5^{th}$ PDCCH monitoring occasions.

According to a method, if the base station configures the repetition number Y, but does not configure the PDCCH monitoring occasion X in a SS/PBCH in a PO, the UE assumes that the Y repetitions of a PDCCH corresponding to the $K^{th}$ SS/PBCH are in the $[(K-1)*Y+y]^{th}$ PDCCH monitoring occasion in a PO, where y=0, 1, . . . , Y−1, S is the number of SS/PBCH, K=1, 2, . . . , S. For example, if S=4 and Y=2, then two PDCCH retransmissions corresponding to a PDCCH of the Is (K=1) SS/PBCH are located in the $1^{st}$ and $2^{nd}$ PDCCH monitoring occasions, and the 2 PDCCH retransmissions corresponding to a PDCCH of the $2^{nd}$ (k=2) SS/PBCH are located in the $3^{rd}$ and $4^{th}$ PDCCH monitoring occasions.

According to a method, if the base station configures the repetition number Y and configures X, the UE assumes that the Y repetitions of a PDCCHx corresponding to the $K^{th}$ SS/PBCH are in the $[(K-1)*Y+yth+x*S*Y+1]^{th}$ PDCCH monitoring occasion in a PO, where y=0, 1, . . . , Y−1, x=0, 1 . . . , X−1, S is the number of SS/PBCH, K=1, 2, . . . , S. For example, if S=4, X=4, and Y=2, then the 2 PDCCH retransmissions of a PDCCH corresponding to the $1^{st}$ (K=1) SS/PBCH are located in the $1^{st}$ and $2^{nd}$ PDCCH monitoring occasions, or in the $9^{th}$ and $10^{th}$ PDCCH monitoring occasions, or in the $17^{th}$ and $18^{th}$ PDCCH monitoring occasions, or in the $25^{th}$ and $26^{th}$ PDCCH monitoring occasions.

According to a method, if the base station configures the repetition number Y and configures X, the UE assumes that the Y repetitions of a PDCCHx corresponding to the $K^{th}$ SS/PBCH are in the $[y*S*X+x*S+K]^{th}$ PDCCH monitoring occasion in a PO, where y=0, 1, . . . , Y−1, x=0, 1 . . . , X−1, S is the number of SS/PBCH, K=1, 2, . . . , S. For example, if S=4, X=4, and Y=2, then the 2 PDCCH retransmissions of a PDCCH corresponding to the $1^{st}$ (K=1) SS/PBCH are located in the $1^{st}$ and $17^{th}$ PDCCH monitoring occasions, or in the $5^{th}$ or $21^{st}$ PDCCH monitoring occasions, or in the $9^{th}$ or $25^{th}$ PDCCH monitoring occasions, or in the $13^{th}$ or $29^{th}$ PDCCH monitoring occasions.

According to a method, if the base station configures the repetition number Y and configures X, the UE assumes that the Y repetitions of a PDCCHx corresponding to the $K^{th}$ SS/PBCH are in the $[y*S+x*S*Y+K]^{th}$ PDCCH monitoring occasion in a PO, where y=0, 1, . . . , Y−1, x=0, 1 . . . , X−1, S is the number of SS/PBCH, K=1, 2, . . . , S. For example, if S=4, X=4, and Y=2, then the 2 PDCCH retransmissions of a PDCCH corresponding to the $1^{st}$ (K=1) SS/PBCH are located in the $1^{st}$ and $5^{th}$ PDCCH monitoring occasions, or in the $9^{th}$ and $13^{st}$ PDCCH monitoring occasions, or in the $17^{th}$ and $21^{th}$ PDCCH monitoring occasions, or in the $25^{th}$ and $29^{th}$ PDCCH monitoring occasions. Preferably, Y<X, the PDCCH repetition corresponding to a SS/PBCH is located in X PDCCH monitoring occasions corresponding to a SS/PBCH.

According to a method, if the base station configures the repetition number Y and configures X, the UE assumes that the Y repetitions of a PDCCHx corresponding to the $K^{th}$ SS/PBCH are in the $[(K-1)*Y*S+y+x*Y+1]^{th}$ PDCCH monitoring occasion in a PO, where y=0, 1, . . . , Y−1, x=0, 1 . . . , X−1, S is the number of SS/PBCH, K=1, 2, . . . , S. For example, if S=4, X=4, and Y=2, then the 2 PDCCH retransmissions of a PDCCH corresponding to the $2^{nd}$ (K=2) SS/PBCH are located in the $9^{th}$ and $10^{th}$ PDCCH monitoring occasions, or in the $11^{th}$ and $12^{th}$ PDCCH monitoring occasions, or in the $13^{th}$ and $14^{th}$ PDCCH monitoring occasions, or in the $15^{th}$ and $16^{th}$ PDCCH monitoring occasions.

According to a method, the base station configures PDCCH repetition, and the base station configures X, then the UE assumes that in the X times of PDCCH monitoring occasions of a SSB, for each repetition sample of the PDCCH sent by the base station, the UE can combine the received repetition samples. For example, the UE assumes that PDCCH repetition samples at the same PDCCH candidate position in X PDCCH monitoring occasions can be combined.

Preferably, the base station configures CORESET or search space or PDCCH monitoring occasion for PDCCH repetition transmission and PDCCH single transmission respectively. Preferably, the base station configures the same CORESET or search space or PDCCH monitoring occasion for PDCCH repetition transmission and PDCCH single transmission. Those skilled in the art will understand that the various illustrative logical blocks, modules, circuits, and steps described in present application can be implemented as hardware, software, or a combination of both. To clearly illustrate this interchangeability of hardware and software, various illustrative components, blocks, modules, circuits, and steps are generally described above in the form of their function sets. Whether such a feature set is implemented as hardware or software depends on the specific application and design constraints imposed on the overall system. Technicians can implement the described function set in different ways for each specific application, but such design decisions should not be construed as causing a departure from the scope of the present application.

The various illustrative logical blocks, modules, and circuits described herein may be implemented or performed with general-purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. The general-purpose processor may be microprocessor, but in the alternative, the processor may be any conventional processor, controller, microcontroller, or state machine. The processor may also be implemented as a combination of computing devices, such as a combination of DSP and microprocessor, a plurality of microprocessors, one or more microprocessors cooperating with DSP core, or any other such configuration.

The steps of the method or algorithm described in present application may be embodied directly in hardware, in software module executed by processor, or in a combination of both. The software module may reside in RAM memory, flash memory, ROM memory, EPROM memory, EEPROM memory, register, hard disk, removable disk, or any other form of storage medium known in the art. Exemplary storage medium is coupled to processor to enable the processor to read and write information from/to the storage medium. In an alternative, the storage medium may be integrated into the processor. The processor and the storage medium may reside in the ASIC. The ASIC may reside in the user terminal. In an alternative, the processor and the storage medium may reside in the user terminal as discrete components.

In one or more exemplary designs, the functions described may be implemented in hardware, software, firmware, or any combination thereof. If implemented in software, each function can be stored as one or more instructions or codes on a computer-readable medium or transmitted through it. The computer-readable medium includes both computer storage medium and communication medium, the latter including any medium that facilitates the transfer of a computer program from one place to another. The storage medium may be any available medium that can be accessed by a general-purpose or special-purpose computer.

The embodiments of the present application are only for ease of description and help comprehensive understanding of the present application, and are not intended to limit the scope of the present application. Therefore, it should be understood that, in addition to the embodiments disclosed herein, all modifications and changes or forms of modifications and changes derived from the technical idea of the present application fall within the scope of the present application.

The above description are only the preferred embodiments of the present invention and are not intended to limit the present invention. Any modification, equivalent replacement, improvement, etc. made within the spirit and principle of the present invention shall be included within the scope of protection of the present invention.

The invention claimed is:

1. A method performed by a user equipment (UE) in a communication system, the method comprising:
   receiving, from a base station, a synchronization signal and a physical broadcast channel (SS/PBCH) block;
   identifying two consecutive slots including Type0-physical downlink control channel (PDCCH) monitoring occasions based on an index of the SS/PBCH block; and
   monitoring PDCCH candidates in a Type0-PDCCH common search space (CSS) set over the two consecutive slots,
   wherein information in a physical broadcast channel (PBCH) associated with the SS/PBCH block indicates a repetition of PDCCHs, and the repetition of the PDCCHs is associated with a same PDCCH candidate in the two consecutive slots.

2. The method of claim 1, wherein a first search space (SS) set and a second SS set are linked to a PDCCH repetition,
   wherein the first SS set and the second SS set have the same periodicity, and
   wherein a first PDCCH monitoring occasion of the first SS set is linked to a second PDCCH monitoring occasion of the second SS set for the PDCCH repetition in a slot.

3. The method of claim 2, wherein a first PDCCH associated with the first SS set is associated with a first transmission configuration indication (TCI) state, and a second PDCCH associated with the second SS set is associated with a second TCI state, and
   wherein the second TCI state is different than the first TCI state.

4. The method of claim 2, wherein a first PDCCH associated with the first SS set triggers an aperiodic channel state information reference signal (CSI-RS),
   wherein a second PDCCH associated with the second SS set triggers the aperiodic CSI-RS, and
   wherein a start symbol of the aperiodic CSI-RS is based on a last symbol of a PDCCH that ends later between the first PDCCH and the second PDCCH.

5. The method of claim 1, wherein a UE capability to monitor PDCCH is based on a first value for a first time duration and a second value for a second time duration,
   wherein a start of the first time duration is predefined.

6. A method performed by a base station in a communication system, the method comprising:
   transmitting, to a user equipment (UE), a synchronization signal and a physical broadcast channel (SS/PBCH) block;
   identifying two consecutive slots including Type0-physical downlink control channel (PDCCH) monitoring occasions according to an index of the SS/PBCH block; and
   transmitting a PDCCH associated with PDCCH candidates in a Type0-PDCCH common search space (CSS) set over the two consecutive slots,
   wherein information in a physical broadcast channel (PBCH) associated with the SS/PBCH block indicates a repetition of PDCCHs, and the repetition of the PDCCHs is associated with a same PDCCH candidate in the two consecutive slots.

7. The method of claim 6, wherein a first search space (SS) set and a second SS set are linked to a PDCCH repetition,
   wherein the first SS set and the second SS set have the same periodicity, and
   wherein a first PDCCH monitoring occasion of the first SS set is linked to a second PDCCH monitoring occasion of the second SS set for the PDCCH repetition in a slot.

8. The method of claim 7, wherein a first PDCCH associated with the first SS set is associated with a first transmission configuration indication (TCI) state, and a second PDCCH associated with the second SS set is associated with a second TCI state, and
   wherein the second TCI state is different than the first TCI state.

9. The method of claim 7, wherein a first PDCCH associated with the first SS set triggers an aperiodic channel state information reference signal (CSI-RS),
   wherein a second PDCCH associated with the second SS set triggers the aperiodic CSI-RS, and
   wherein a start symbol of the aperiodic CSI-RS is based on a last symbol of a PDCCH that ends later between the first PDCCH and the second PDCCH.

10. The method of claim 6, wherein a UE capability to monitor PDCCH is based on a first value for a first time duration and a second value for a second time duration,
    wherein a start of the first time duration is predefined.

11. A user equipment (UE) in a communication system, the UE comprising:
    a transceiver; and
    at least one processor configured to:
      receive, from a base station, a synchronization signal and a physical broadcast channel (SS/PBCH) block;
      identify two consecutive slots including Type0-physical downlink control channel (PDCCH) monitoring occasions based on an index of the SS/PBCH block; and
      monitor PDCCH candidates in a Type0-PDCCH common search space (CSS) set over the two consecutive slots,
    wherein information in a physical broadcast channel (PBCH) associated with the SS/PBCH block indicates a repetition of PDCCHs, and the repetition of the PDCCHs is associated with a same PDCCH candidate in the two consecutive slots.

12. The UE of claim 11,
    wherein a first search space (SS) set and a second SS set are linked to a PDCCH repetition,
    wherein the first SS set and the second SS set have the same periodicity, and
    wherein a first PDCCH monitoring occasion of the first SS set is linked to a second PDCCH monitoring occasion of the second SS set for the PDCCH repetition in a slot.

13. The UE of claim 12,
    wherein a first PDCCH associated with the first SS set is associated with a first transmission configuration indication (TCI) state, and a second PDCCH associated with the second SS set is associated with a second TCI state, and wherein the second TCI state is different than the first TCI state.

14. The UE of claim 12, wherein a first PDCCH associated with the first SS set triggers an aperiodic channel state information reference signal (CSI-RS), wherein a second PDCCH associated with the second SS set triggers the aperiodic CSI-RS, and wherein a start symbol of the aperiodic CSI-RS is based on a last symbol of a PDCCH that ends later between the first PDCCH and the second PDCCH.

15. The UE of claim 11, wherein a UE capability to monitor PDCCH is based on a first value for a first time duration and a second value for a second time duration, wherein a start of the first time duration is predefined.

16. A base station in a communication system, the base station comprising:

a transceiver; and at least one processor configured to:

transmit, to a user equipment (UE), a synchronization signal and a physical broadcast channel (SS/PBCH) block;

identify two consecutive slots including Type0-physical downlink control channel (PDCCH) monitoring occasions according to an index of the SS/PBCH block; and transmit a PDCCH associated with PDCCH candidates in a Type0-PDCCH common search space (CSS) set over the two consecutive slots, wherein information in a physical broadcast channel (PBCH) associated with the SS/PBCH block indicates a repetition of PDCCHs, and the repetition of the PDCCHs is associated with a same PDCCH candidate in the two consecutive slots.

17. The base station of claim 16, wherein a first search space (SS) set and a second SS set are linked to a PDCCH repetition, wherein the first SS set and the second SS set have the same periodicity, and wherein a first PDCCH monitoring occasion of the first SS set is linked to a second PDCCH monitoring occasion of the second SS set for the PDCCH repetition in a slot.

18. The base station of claim 17, wherein a first PDCCH associated with the first SS set is associated with a first transmission configuration indication (TCI) state, and a second PDCCH associated with the second SS set is associated with a second TCI state, and wherein the second TCI state is different than the first TCI state.

19. The base station of claim 17, wherein a first PDCCH associated with the first SS set triggers an aperiodic channel state information reference signal (CSI-RS), wherein a second PDCCH associated with the second SS set triggers the aperiodic CSI-RS, and wherein a start symbol of the aperiodic CSI-RS is based on a last symbol of a PDCCH that ends later between the first PDCCH and the second PDCCH.

20. The base station of claim 16, wherein a UE capability to monitor PDCCH is based on a first value for a first time duration and a second value for a second time duration, wherein a start of the first time duration is predefined.

* * * * *